(12) United States Patent
Niwata et al.

(10) Patent No.: US 6,193,162 B1
(45) Date of Patent: Feb. 27, 2001

(54) DISK-CARTRIDGE-TYPE ADAPTER

(75) Inventors: Tsuyoshi Niwata; Shigeru Hashimoto; Nobuhiko Akasaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/055,884

(22) Filed: Apr. 7, 1998

(30) Foreign Application Priority Data

Oct. 21, 1997 (JP) .................................................. 9-288697

(51) Int. Cl.$^7$ .................................................. G06K 19/00
(52) U.S. Cl. .......................... 235/487; 235/382; 235/492; 235/472.01
(58) Field of Search .................................. 235/382, 492, 235/472, 487

(56) References Cited

U.S. PATENT DOCUMENTS

| | | | |
|---|---|---|---|
| 5,159,182 | 10/1992 | Eisele | 235/380 |
| 5,338,923 | 8/1994 | Grieu | 235/380 |
| 5,457,590 | 10/1995 | Barrett et al. | 235/380 |
| 5,465,381 | * 11/1995 | Schmidt et al. | 395/800 |
| 5,471,038 | 11/1995 | Eisele et al. | 235/380 |
| 5,486,687 | * 1/1996 | Le Roux | 235/382 |
| 5,526,342 | 6/1996 | Akiyama et al. | 369/291 |
| 5,584,043 | 12/1996 | Burkart | 235/380 |
| 5,610,893 | * 3/1997 | Soga et al. | 369/84 |
| 5,610,902 | * 3/1997 | Childers et al. | 369/289 |
| 5,679,007 | * 10/1997 | Potdevin et al. | 439/76.1 |

FOREIGN PATENT DOCUMENTS 0 206 897 A2   12/1986   (EP) .
02101690        4/1990    (JP) .
WO 90/04847     5/1990    (WO) .

OTHER PUBLICATIONS

European Patent Office Communication for European Patent Application No. 98302749 including European Search Report dated Feb. 24, 2000.

* cited by examiner

*Primary Examiner*—Karl D. Frech
*Assistant Examiner*—Daniel S. Felten
(74) *Attorney, Agent, or Firm*—Armstrong, Westerman, Hattori, McLeland & Naughton

(57) ABSTRACT

A disk-cartridge-type adapter is capable of preventing damage to a head of the adapter and a head of a disk cartridge drive into which the adapter is inserted, even if these heads are deviated from each other. The adapter is also capable of effectively using the functions of the disk cartridge drive.

The head of the adapter has a gap width and a head length that are sufficiently large to cover a setting error between the heads of the adapter and disk cartridge drive. The head of the adapter is covered with protective films having grooves. The head of the adapter has reinforcing supports each having a hollow in which the head of the disk cartridge drive moves. The head and supports of the adapter have holes for passing a shaft fixed to the adapter. The diameter of the holes is greater than that of the shaft. The adapter has a write-protect mechanism and a double-density detecting mechanism. The adapter has a card slot provided with a stepped part, and a hole used to extract an IC card from the adapter. The adapter has a unit for sidewardly inserting and extracting a power source into and from the adapter. The adapter has heat radiation holes.

6 Claims, 25 Drawing Sheets

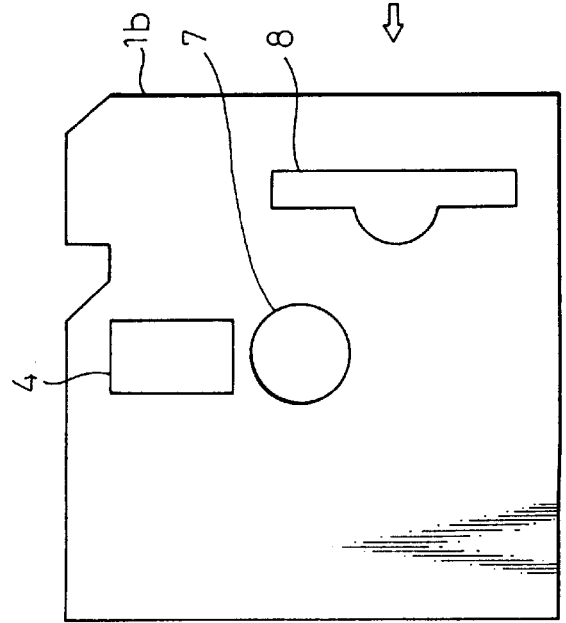
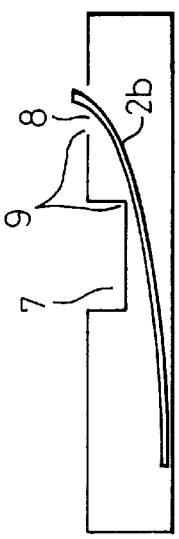
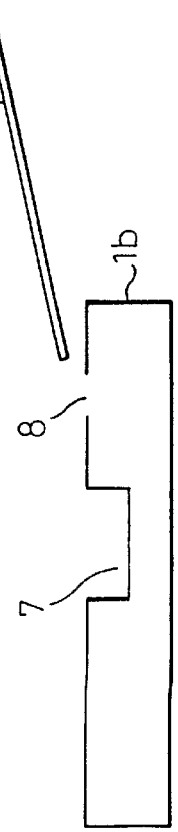
Fig.3(a)
Fig.3(b)
Fig.3(c)

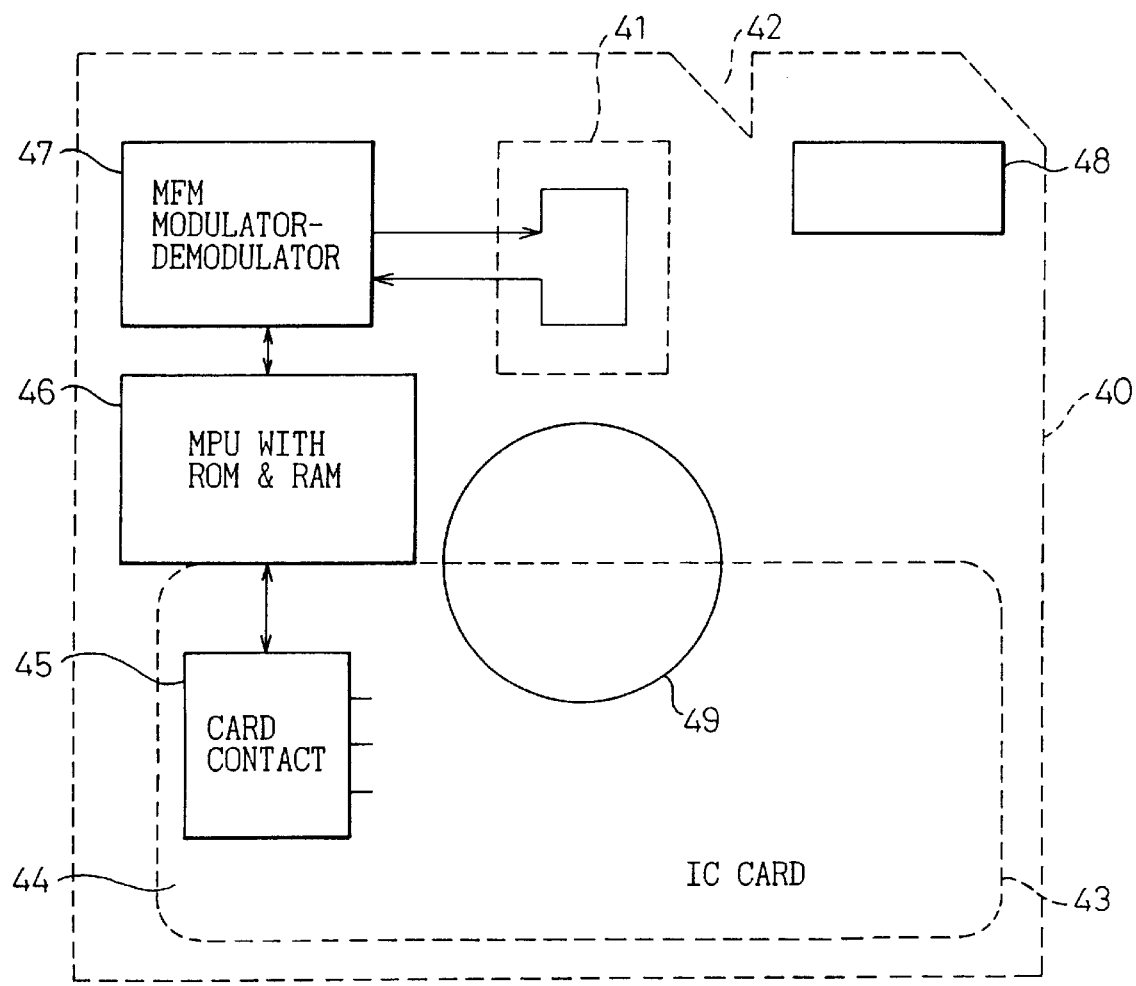

Fig.7(a)
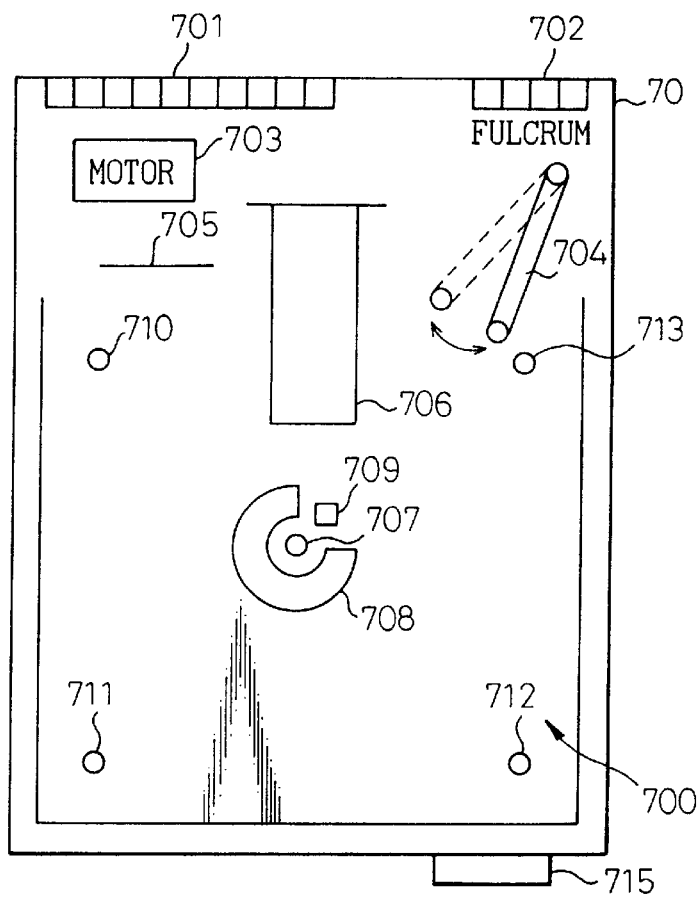
Fig.7(b)
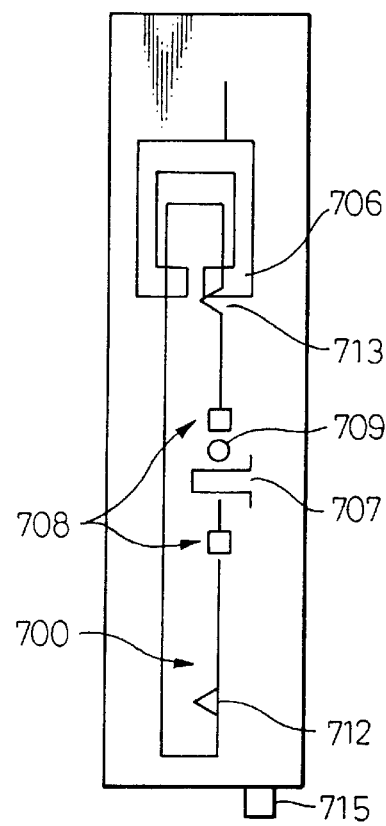
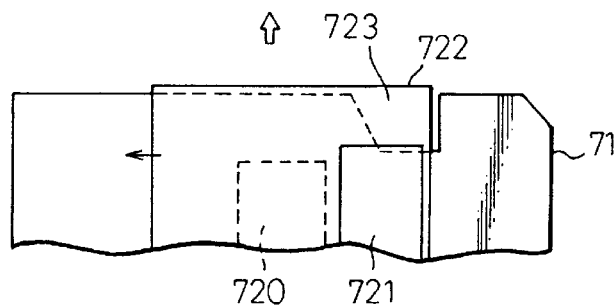
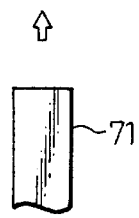

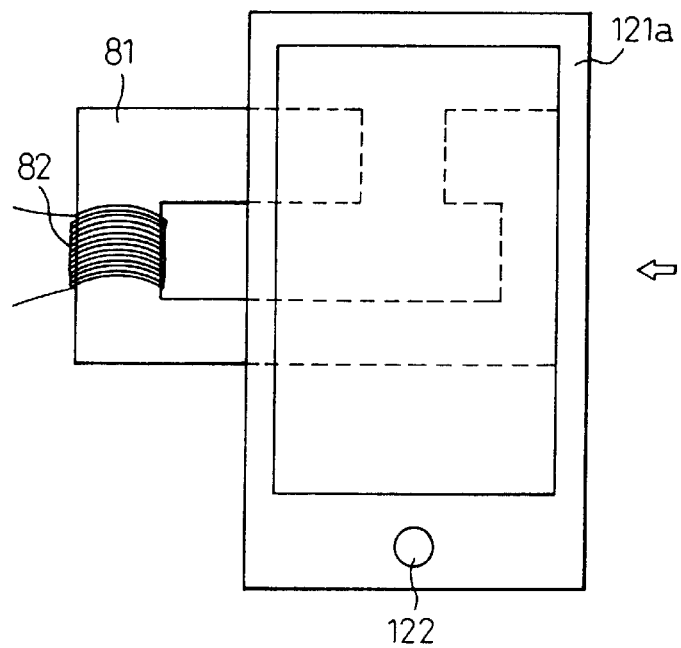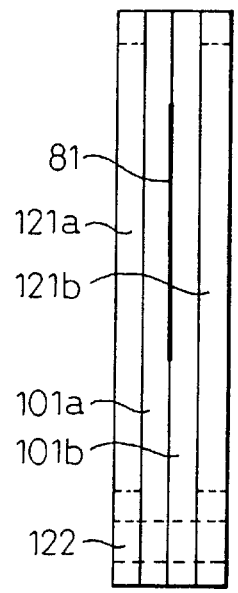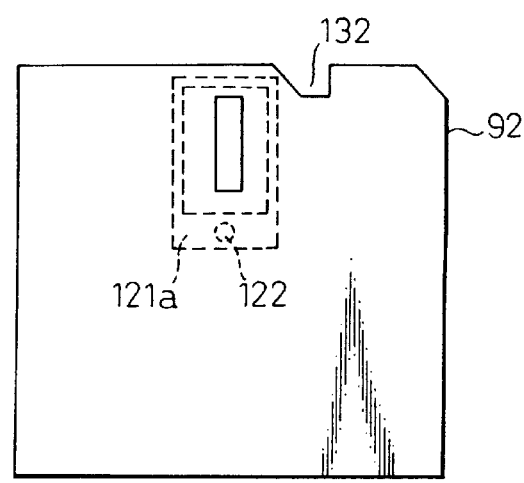

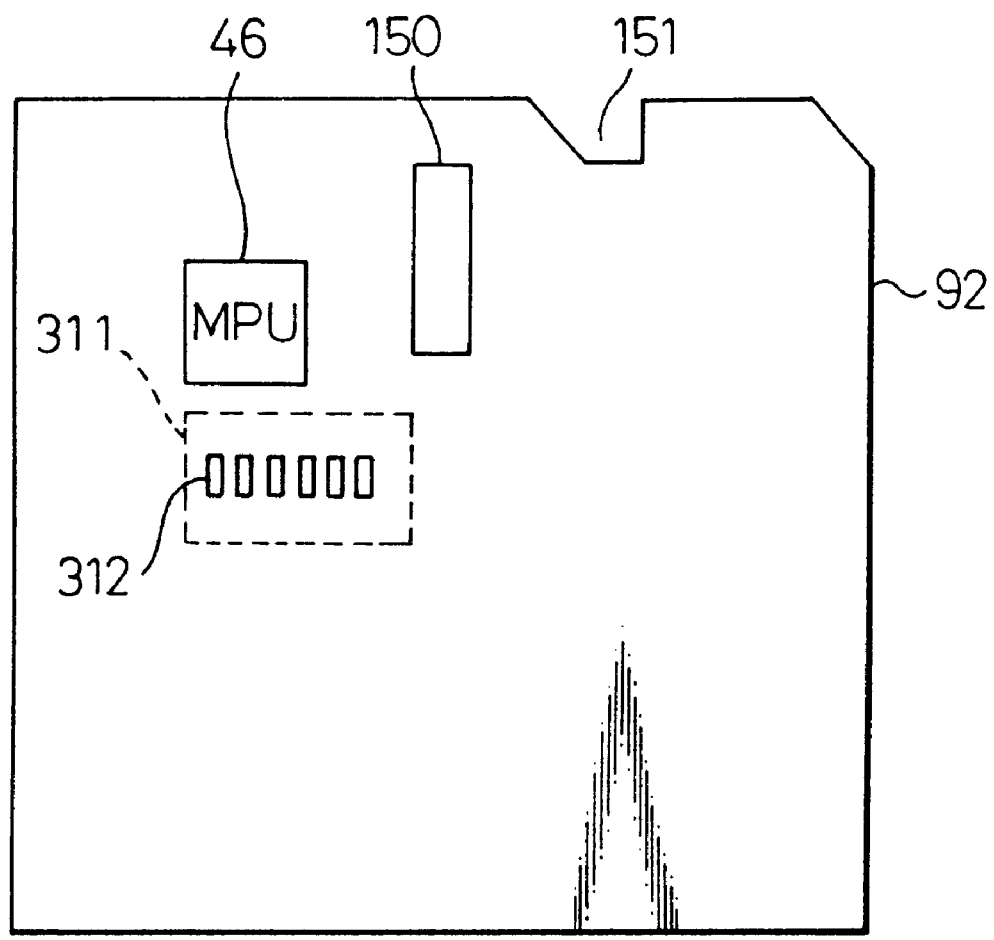

DISK-CARTRIDGE-TYPE ADAPTER

BACKGROUND OF THE INVENTION

1. Field of the Invention

The present invention relates to a disk-cartridge-type adapter having an improved head structure and/or being capable of effectively using the functions of a disk cartridge drive. The adapter has the same external shape as a disk cartridge, such as a 3.5-inch FPD (floppy disk) cartridge. The adapter accommodates a card unit, such as an IC card, having a semiconductor memory to and from which information, such as electronic money information, is written and read. Alternatively, the adapter itself incorporates a semiconductor memory. The adapter is inserted into a disk cartridge drive such as a 3.5-inch FDD (floppy disk drive).

2. Description of the Related Art

Disk-cartridge-type adapters are disclosed in, for example, a Japanese Unexamined Patent Publication (Kohyo) No. 6-509194 corresponding to U.S. Pat. No. 5,584,043, and a Japanese Examined Patent Publication (Kokoku) No. 7-86912 corresponding to U.S. Pat. No. 5,159,182.

FIG. 1 is a block diagram showing one of the adapters disclosed in the publications. The adapter 1a has the same external shape as a standard 3.5-inch FPD cartridge and incorporates a semiconductor memory 2a for storing, for example, electronic money data. The adapter 1a is composed of a magnetic head 3, an opening 4 for making the head 3 face a magnetic head of an FDD (not shown), and a battery 5a for supplying power to the memory 2a.

The memory 2a employs the same data format as FPDs. The adapter 1a is inserted into the FDD so that data is transferred between the memory 2a and a data processor, such as a personal computer, through the FDD.

FIG. 2 is a block diagram showing another adapter disclosed in the publications. The adapter 1b has the same external shape as the 3.5-inch FPD cartridge and incorporates an IC card 2b for storing, for example, electronic money data. The adapter 1b is composed of a microprocessor (MPU) 6, a magnetic head 3, an opening 4 to allow the head 3 face a magnetic head of an FDD, and a battery (or a generator) 5b for supplying power to the IC card 2b and MPU 6. The adapter 1b has a circular recess 7. In the case of the FPD cartridge, the recess 7 is used to hold a metal hub that is attracted by a magnet attached to a spindle of the FDD. The opening 4 including the head 3 is sandwiched between tips of a magnetic head of the FDD, to establish magnetic coupling between them.

Data is read out of the IC card 2b and is converted by the MPU 6 into data in the FPD format. The adapter 1b is inserted into the FDD, and data from a data processor, such as a personal computer, is transferred to the MPU 6 through the FDD and head 3. The MPU 6 converts the data into that to be written into the IC card 2b and writes it into the IC card 2b. Data from the IC card 2b is converted by the MPU 6 into data of FPD format and is transferred to the data processor through the head 3 and FDD.

The head positions of the conventional adapters are fixed and are dependent on the manufacturer thereof. Accordingly, when inserted into an FDD, the head of an adapter may not correctly face the head of the FDD. In this case, it is impossible for the FDD to write and read data to and from the adapter. Since the head positions of adapters differ depending on manufacturers, the head of a given adapter is not always positioned in the middle of the tips of the head of the FDD. If the head of the adapter is biased from the middle position between the tips of the head of the FDD, the head of the adapter may be excessively pressed to one of the tips of the head of the FDD and break the same.

Another problem of the conventional adapters will be explained with reference to FIGS. 3(a) to 3(c) in which FIG. 3(a) is a plan view showing one of the conventional adapters, and FIGS. 3(b) and 3(c) are side views showing the same before and after insertion of an IC card into the adapter. In these figures, the same parts as those of FIG. 2 are represented with the same reference numerals and are not explained again. The adapter has a slot 8 for receiving the IC card 2b, and corners 9 formed at the slot 8 and a recess 7. Since the slot 8 is formed on the surface of the adapter, the IC card 2b may be damaged by the corners 9 when it is inserted into the slot 8. In addition, the IC card 2b may be warped when it is inserted into the slot 8 and may be damaged by this.

The conventional adapters are not provided with a write-protect mechanism or a double-density detecting mechanism usually provided for FPDs, and therefore, the conventional adapters are incapable of effectively using the functions of a disk cartridge drive.

The Japanese Unexamined Patent publication (Kohyo) No. 6-509194 and the Japanese Examined Patent Publicaiton (Kokoku) No. 7-86912 mentioned above disclose nothing about insertion and extraction of a battery to and from the adapter. The publications do not teach how to insert and extract a battery to and from the cartridge.

SUMMARY OF THE INVENTION

An object of the present invention is to provide a disk-cartridge-type adapter whose head position is adaptable to a head position of a disk cartridge drive, to prevent a damage of the heads of the adapter and disk cartridge drive.

Another object of the present invention is to provide a disk-cartridge-type adapter having a write-protect mechanism and/or a double-density detecting mechanism, like a standard FPD, to effectively use the functions of a disk cartridge drive.

Still another object of the present invention is to provide a disk-cartridge-type adapter having a simple structure for inserting and extracting a power source to and from the adapter.

In order to accomplish the objects, the present invention provides a disk-cartridge-type adapter for accommodating a recording medium, shaped to be inserted into a slot of a standard disk cartridge drive. The adapter has a head that faces a head of the disk cartridge drive and transfers data to and from the disk cartridge drive. A gap width of the head of the adapter is wider than a gap width of the head of the disk cartridge drive, and a gap length of the head of the adapter is longer than the head of the disk cartridge drive.

The disk cartridge driver has a reference head position, and the head of the adapter usually involves a positional error with respect to the reference position. The adapter of the present invention prevents such a positional error so that the disk cartridge drive may correctly access fixed tracks of the adapter.

The present invention also provides a disk-cartridge-type adapter having a head covered with protective films.

The protective films prevent direct contact between the head of the adapter and the head of the disk cartridge drive, to thereby avoid damage on the heads.

The protective films may have at least one groove running in a direction in which the head of the disk cartridge drive moves.

The grooves reduce friction between the head of the adapter and the head of the disk cartridge drive, to smooth the movement of the head of the disk cartridge drive and maintain the correct operation thereof.

The head of the adapter may have a support having a hollow in which the head of the disk cartridge drive moves.

The support provides the head of the adapter with rigidity to prevent a deformation due to pressure from the head of the disk cartridge drive, and at the same time, maintain the flexibility of the head of the adapter.

The head of the adapter may have a shaft hole for passing a shaft for fixing the head. The diameter of the shaft hole is greater than the diameter of the shaft so that the head of the adapter may move within the adapter along the shaft so that the head of the adapter is evenly pressed by the head of the disk cartridge drive.

This arrangement is capable of absorbing manufacturer variations in head positions of disk cartridge drives. The head of the adapter moves to a balanced position in response to pressure from the head of the disk cartridge drive, to reduce a load on the heads of the adapter and disk cartridge drive.

The adapter of the present invention may have a write-protect mechanism at a position where a standard disk cartridge has a write-protect mechanism. The write-protect mechanism of the present invention is used to enable and disable write operation to the adapter. This results in effectively using the functions of the disk cartridge drive.

Disabling the write operation to the adapter will protect important data stored in the adapter.

The present invention also provides a disk-cartridge-type adapter having a space for accommodating a semiconductor memory that stores various kinds of information. The adapter has a double-density detecting mechanism at a position where a standard disk cartridge has a double-density detecting mechanism, to effectively use the functions of the disk cartridge drive.

A semiconductor memory to be inserted into the adapter is selected depending on the performance of a disk cartridge drive so that the disk cartridge drive may properly control the adapter.

The adapter of the present invention may have heat radiation holes.

The heat radiation holes properly cool the adapter without a special cooling device such as a cooling fan.

BRIEF DESCRIPTION OF THE DRAWINGS

FIG. 3(a) is a plan view showing a disk-cartridgetype adapter according to still another prior art and FIGS. 3(b) and 3(c) are side views showing the adapter before and after insertion of an IC card to the adapter;

FIG. 4 shows a disk-cartridge-type adapter according to the present invention, having the same external shape as a 3.5-inch FPD;

FIGS. 7(a) and 7(b) are plan and side views showing the inside of the FDD and part of an FPD to be inserted into the FDD;

FIG. 12(a) is a plan view showing a disk-cartridge-type adapter according to a fourth embodiment of the present invention, and FIG. 12(b) shows the same seen from an arrow mark of FIG. 12(a);

FIG. 13 is a plan view showing the disk-cartridge-type adapter of the fourth embodiment;

FIG. 31 is a plan view showing a disk-cartridge-type adapter according to a tenth embodiment of the present invention.

DESCRIPTION OF THE PREFERRED EMBODIMENTS

Figure 1:
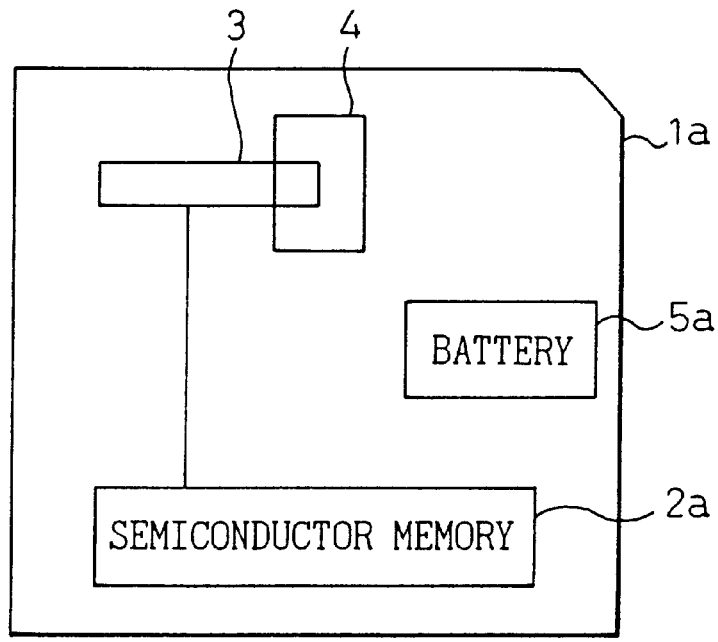
FIG. 1 shows a disk-cartridge-type adapter according to a prior art.
Figure 2:
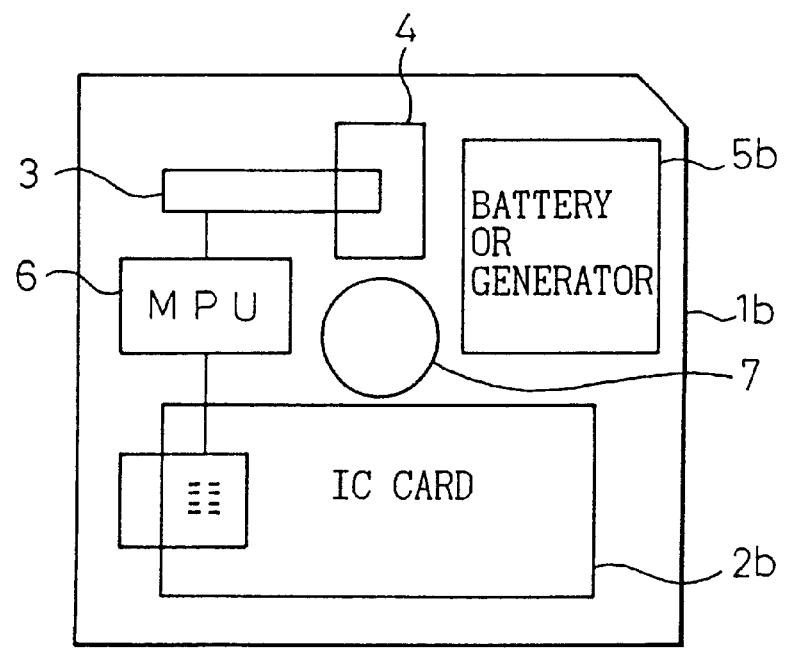
FIG. 2 shows a disk-cartridge-type adapter according to another prior art.

In the following explanation, each disk-cartridge-type adapter has the same shape as a 3.5-inch FPD, and a disk cartridge drive is an FDD for driving the 3.5-inch FPD. Like reference numerals represent like parts throughout the drawings.

Basic structures of the FDD and a disk-cartridge-type adapter based on the present invention will be explained with reference to FIGS. 4 to 7.

FIG. 4 shows the surface of the disk-cartridge-type adapter 40 having the same shape as a standard 3.5-inch FPD. The adapter 40 has a head 41. In the case of the FPD, a head thereof is covered with a shutter when the FPD is outside the FDD so that no dust enters the head. When the FPD is inserted into the FDD, the shutter is opened to magnetically couple the FPD with a magnetic head of the FDD. Although FPDs are always provided with a shutter, the adapter 40 of the present invention is not always provided with a shutter. The adapter 40 has a cut 42 to receive a shutter opening/closing knob of the FDD. The knob opens the shutter when the adapter 40 is inserted into the FDD.

Even if the adapter 40 has no shutter, it must have the cut 42 so that the adapter 40 may have the same shape as the FPD. The adapter 40 has a card space 43 for receiving an IC card 44. In FIG. 4, the IC card 44 is in the card space 43.

A card contact 45 writes and reads data to and from the IC card 44. An MPU 46 has a ROM for storing a program to control data communication between the IC card 44 and the FDD 70, and a RAM for temporarily storing data necessary for the data communication. The adapter 40 further has an MFM (modified FM) modulator-demodulator 47, a battery 48, and a central circular recess 49. In the case of the FPD, the recess 49 holds a circular metal hub that is attracted by a magnet linked to a spindle of a motor of the FDD 70. The recess 49 of the adapter 40 may have a metal hub or not.

Figure 5:
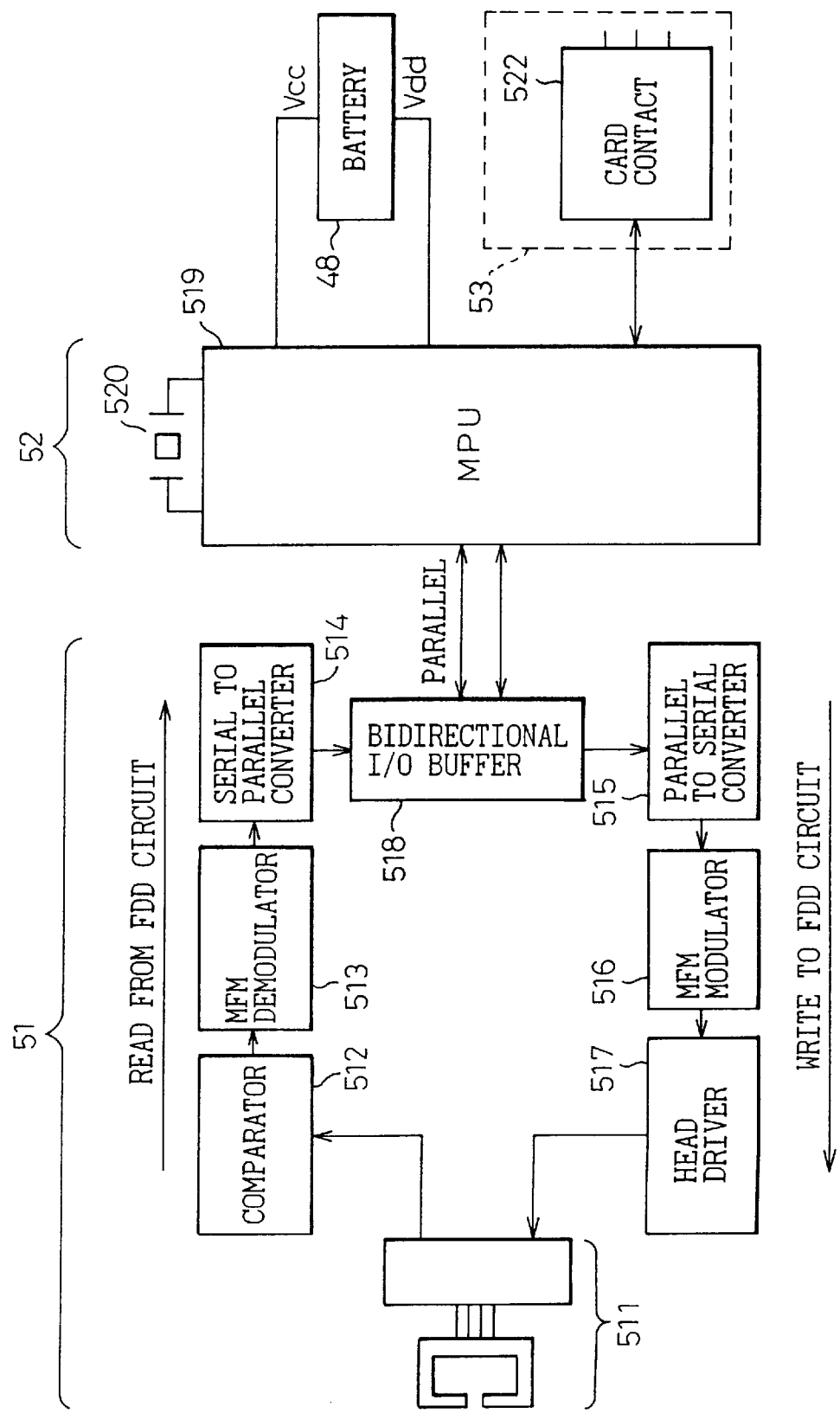
FIG. 5 shows an electrical arrangement of the adapter of FIG. 4.

FIG. 5 shows an electrical configuration of the adapter 40. The adapter 40 has a drive interface 51 for communicating with the FDD, an MPU block 52, and a card interface 53 for communicating with the IC card 44. The drive interface 51 has a head 511, a read-from-FDD circuit, and a write-to-FDD circuit.

The read-from-FDD circuit includes a comparator 512, an MFM demodulator 513, and a serial-to-parallel converter 514. The write-to-FDD circuit includes a parallel-to-serial converter 515, an MFM modulator 516, and a head driver 517. The output of the converter 515 is supplied to a bidirectional I/O buffer 518. The output of the buffer 518 is supplied to the converter 515. The buffer 518 carries out bidirectional communication with an MPU 519 in the MPU block 52.

The MPU block 52 has the MPU 519 (the MPU 46 of FIG. 4) and a clock unit 520 for controlling the MPU 519.

The card interface 53 has a card contact 522 (the card contact 45 of FIG. 4) that is electrically connected to the IC card 44.

The operation of the adapter 40 will be explained. Data transfer between the IC card 44 and the MPU 519 is done serially through the card contact 522. Data transfer between the MPU 519 and the FDD 70 is done with magnetic coupling through the MFM demodulator 513 and MFM modulator 516. The FDD 70 carries out data transfer with a data processor, such as a personal computer, to thereby realize data transfer between the IC card 44 and the data processor.

Figure 6A:
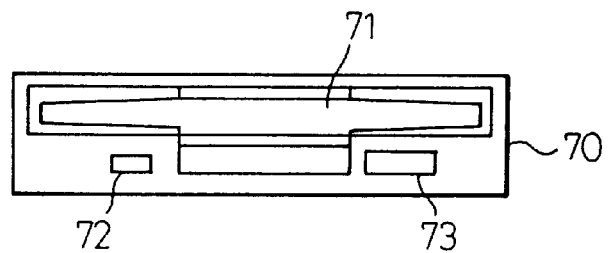
FIGS. 6(a), 6(b), and 6(c) are front, horizontal sectional, and side views showing an FDD for driving the adapter of FIG. 4 and an FPD.
Figure 6B:
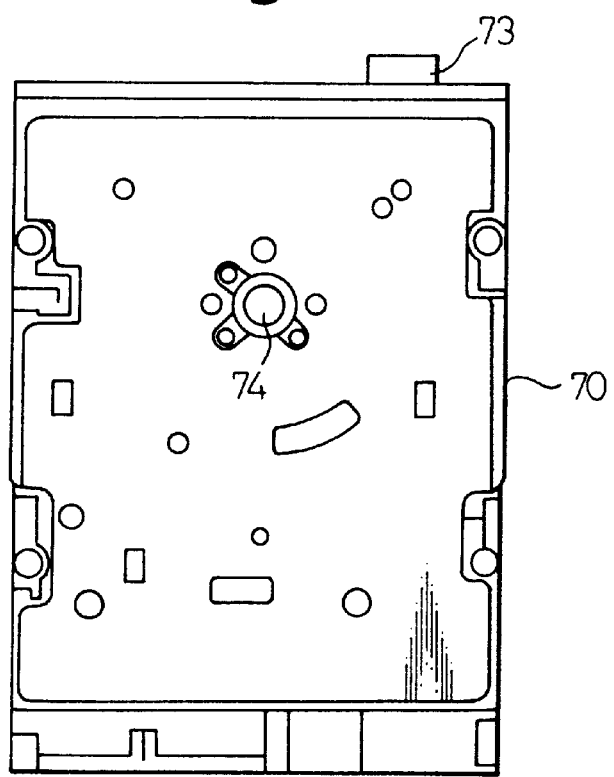
Figure 6C:

FIG. 6(*a*) is a front view showing the FDD 70 into which the adapter 40 or FPD is inserted, FIG. 6(*b*) is a horizontal cross section showing the FDD 70, and FIG. 6(*c*) is a side view showing the FDD 70. The FDD 70 has a slot 71 into which the adapter 40 or FPD is inserted, an LED 72 that lights up when the FDD 70 operates, and an eject button 73 that is pushed to eject the adapter 40 or FPD from the FDD 70.

A spindle 74 is driven by a motor. A magnet (not shown) is attached to the spindle 74, to attract the metal hub of the FPD.

FIG. 7(*a*) is a plan view showing the internal structure of the FDD 70 and a part of an FPD 71 to be inserted into the FDD 70, and FIG. 7(*b*) is a right side view showing these parts. The FDD 70 has a housing 700 for accommodating the FPD 71 or adapter 40, a signal interface 701 for transferring signals to and from a data processor (not shown), such as a personal computer, and a power source interface 702.

The motor 703 rotates a magnetic disk stored in the FPD 71. The FPD 71 has a head 720 and a shutter 722 that covers the head 720. When the FPD 71 is inserted into the FDD 70, the tip of a shutter opening/closing knob 704 slides along a cut 723 and opens the shutter 722. When the FPD 71 is removed from the FDD 70, the shutter 722 closes.

A stopper 705 stops a front end of the FPD 71. A head 706 is used to read and write the FPD 71. The motor 703 drives the spindle 707 and C-shaped magnet 708 that attracts the metal hub (not shown) on the back face of the FPD 71, to surely rotate the magnetic disk contained in the FPD 71. A drive pin 709 engages with a hole formed on the metal hub of the FPD 71, to surely rotate the magnetic disk in the FPD 71. FPD positioning bosses 710 and 713 fix the position of the FPD 71 in the FDD 70. A double-density detecting mechanism 711 determines whether the FPD 71 is 2HD or 2DD. A write-protect detecting mechanism 712 determines whether or not the FPD 71 is write-protected. An eject button 715 is used to eject the FPD 71 from the FDD 70.

The FPD 71 has a window 721. When the FPD 71 is inserted into the FDD 70, the knob 704 moves the shutter 722 leftward along an arrow mark of FIG. 7(a). As a result, the head 720 overlaps the window 721 and faces the head 706 of the FDD 70.

Now, preferred embodiments of the present invention will be explained.

First Embodiment

Figure 8:
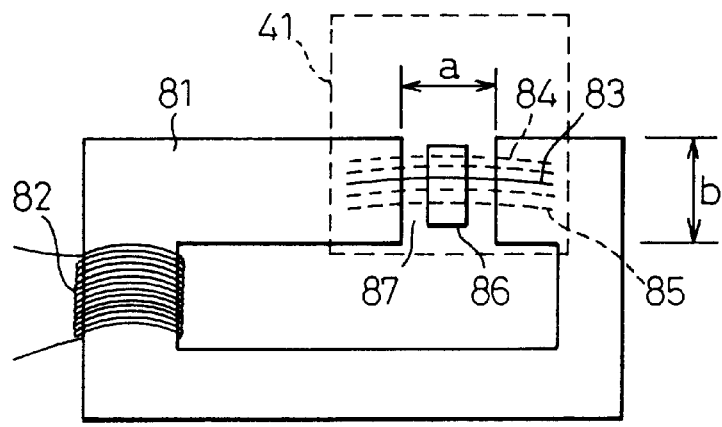
FIG. 8 is a sectional view showing a head of a disk-cartridge-type adapter according to a first embodiment of the present invention.

FIG. 8 is a sectional view showing a head 41 of a disk-cartridge-type adapter according to the first embodiment of the present invention. The head 41 has a magnet 81 and a coil 82. The adapter is inserted into the FDD 70 of FIG. 7 whose head has a reference track 83. If the head 41 of the adapter is biased from the head of the FDD 70, the reference track 83 will be shifted to an upper track 84 or a lower track 85. In this way, if the head 41 of the adapter deviates from the head of the FDD 70, the reference track 83 of the FDD 70 will move within a range 86. Although the range 86 is rectangular in FIG. 8, it is nearly square in practice. The reason of deviation of the head 41 from the FDD head will be explained. The position of an FPD in the FDD 70 is determined by the positioning bosses (reference pins) 710 and 713 of FIG. 7. Holes on the adapter to receive the reference pins have a little play so that the adapter is easily set in the FDD 70. The play, however, causes the head 41 of the adapter to deviate from the head of the FDD 70. This deviation is within plus/minus 0.35 mm in each of width and length directions. To cover the deviation, the head 41 of the adapter of the present invention has a width gap "a" that is larger than the gap width of the FDD 70 by 0.35 mm or over and has a gap length "b" that is larger than the gap length of the FDD 70 by 0.35 mm or over.

Figure 9A:
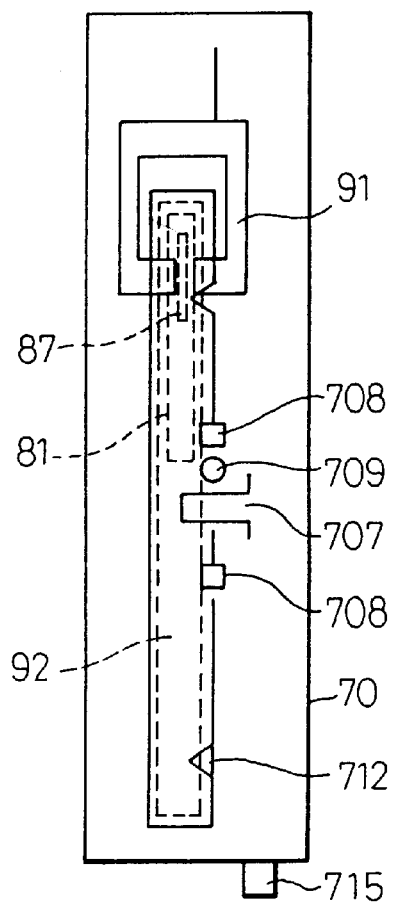
FIG. 9(a) is a perspective side view showing an FDD with the adapter of FIG. 8 inserted therein.
Figure 9B:
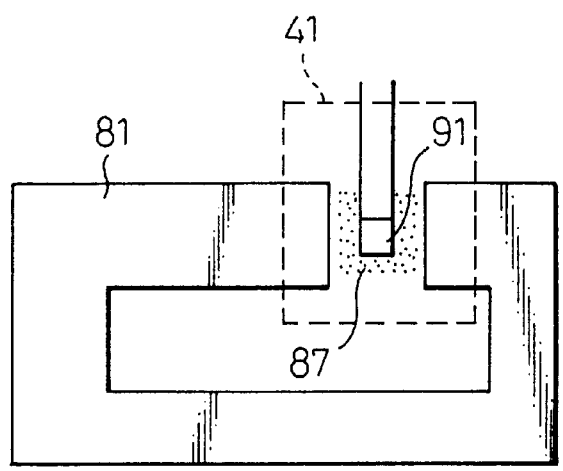
FIG. 9(b) shows the heads of the FDD and adapter seen from the left of FIG. 9(a)

FIG. 9(a) is a perspective side view showing the FDD 70 with the adapter 92 of FIG. 8 set therein, and FIG. 9(b) is a view seen from the left of FIG. 9(a), showing the relationship between the head 41 of the adapter 92 and the head 91 (706 in FIG. 7) of the FDD 70. In FIG. 7, the FDD 70 has the spindle 707, magnet 708, driving pin 709, write-protect detecting mechanism 712, and eject button 715. In FIG. 9(b), the head 91 of the FDD 70 is positioned in a gap 87 of the magnet 81 of the head 41 of the adapter 92. The gap 87 serves as a read/write allowance in which the head 91 is variably positioned due to a setting error.

Second Embodiment

Figure 10A:
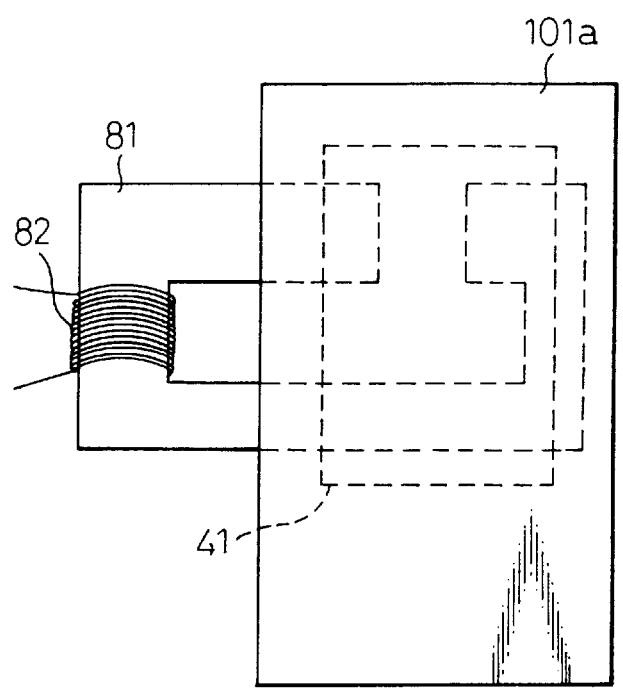
FIGS. 10(a) and 10(b) are plan and side views showing a head of a disk-cartridge-type adapter according to a second embodiment of the present invention.
Figure 10B:
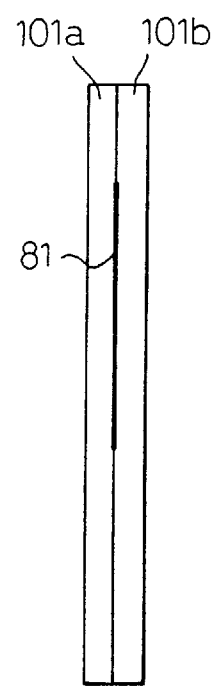

FIG. 10(a) is a plan view showing a head of a disk-cartridge-type adapter according to the second embodiment of the present invention, and FIG. 10(b) is a side view showing the same. The second embodiment covers and protects each face of the head 41 with films 101a and 101b made of, for example, a polyimide that does not affect a magnetic field. The thickness of a magnet 81 of the head 41 is, for example, 0.1 mm and the thickness of each of the films 101a and 101b is, for example, 0.1 mm. Although the magnet 81 is thinner than the films 101a and 101b in FIG. 10(b) for the sake of simplicity, they have substantially the same thickness in practice.

The films 101a and 101b attached to each face of the metal head 41 prevent the head 41 from directly contacting the head 91 of the FDD 70 of FIG. 9(a), thereby protecting the heads of both the adapter and FDD.

Third Embodiment

Figure 11A:
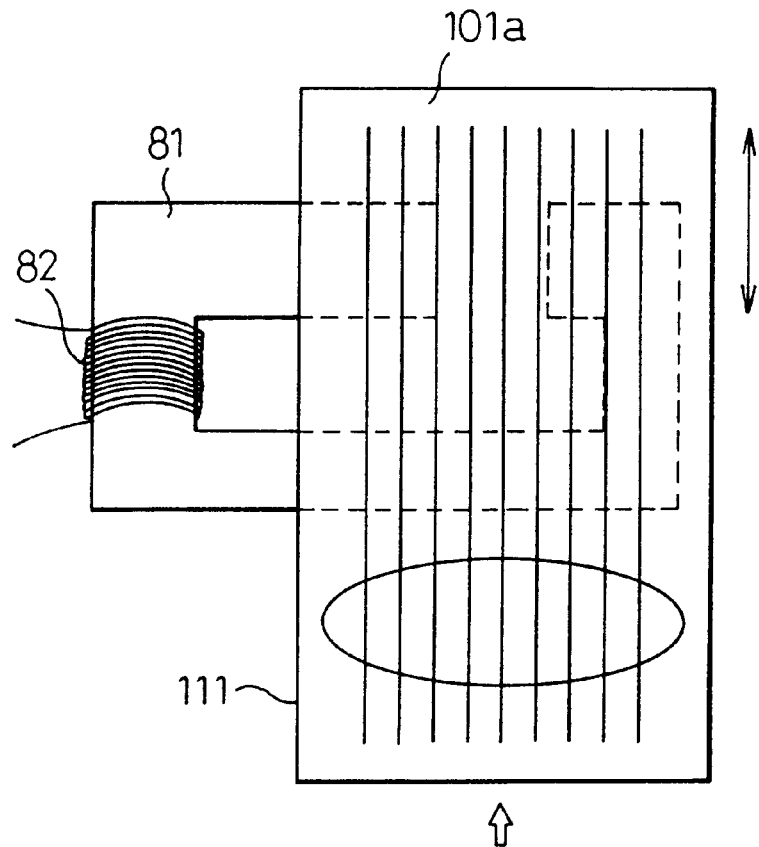
FIG. 11(a) is a plan view showing a head of a disk-cartridge-type adapter according to a third embodiment of the present invention.
Figure 11B:
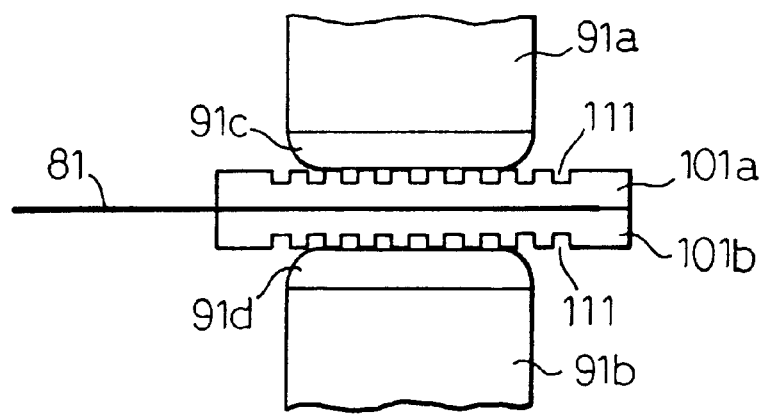
FIG. 11(b) shows the same seen from an arrow mark of FIG. 11(a)

FIG. 11(a) is a plan view showing a head of a disk-cartridge-type adapter according to the third embodiment of the present invention, and FIG. 11(b) is a side view of the same seen from an arrow mark of FIG. 11(a). The head of the adapter has films 101a and 101b that are basically the same as those of FIGS. 10(a) and 10(b) and are provided with at least one groove 111. The head of the adapter is sandwiched between head elements 91a and 91b of the head 91 of the FDD 70. At this time, a tip 91c of the head element 91a comes into contact with the film 101a, and the grooves 111 reduce the friction between the tip 91c and the film 101a. Similarly, the grooves 111 reduce the friction between a tip 91d of the head element 91b and the film 101b. This results in reducing the load on the head 91 of the FDD 70, so that the head 91 moves smoothly without a malfunction. This reduces the abrasion of the films 101a and 101b.

Fourth Embodiment

FIG. 12(a) is a plan view showing a head of a disk-cartridge-type adapter according to the fourth embodiment of the present invention, and FIG. 12(b) is a side view showing the same seen from an arrow mark of FIG. 12(a). The head of the adapter has films 101a and 101b similar to the second and third embodiments. The film 111a is provided with a support 121a, and the film 101b is provided with a support 121b. Each of the supports 121a and 121b has a hollow to allow the head 91 of the FDD 70 of FIG. 9(a) move within. The films 101a and 101b must be as thin as possible to secure magnetic coupling between the heads of the adapter and FDD. However, the thinner the films, the more the films warp. The supports 121a and 121b reinforce the films 101a and 101b. The supports 121a and 121b are provided with holes 122 for passing a shaft for fixing the supports 121a and 121b to the adapter 92.

FIG. 13 is a plan view showing the supports 121a and 121b fixed to the adapter 92 with a shaft passing through the holes 122. Since the support 121b is on the underside, it is not shown in the figure.

Fifth Embodiment

Figure 14A:
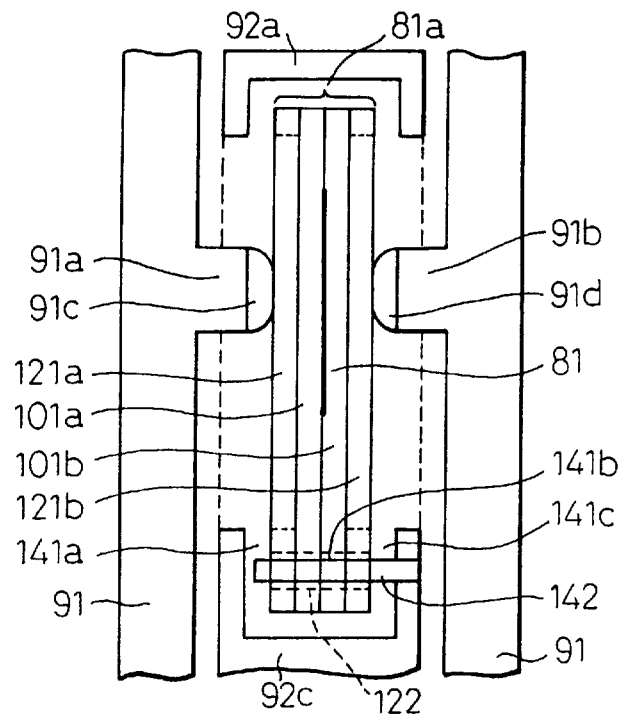
FIG. 14(a) is a partial sectional view showing a disk-cartridge-type adapter according to a fifth embodiment of the present invention inserted in an FDD.
Figure 14B:
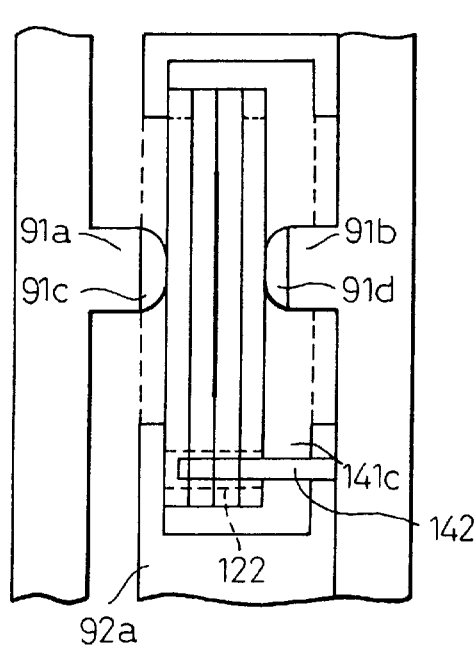
FIG. 14(b) shows the same with a head of the adapter biased to the left.
Figure 14C:
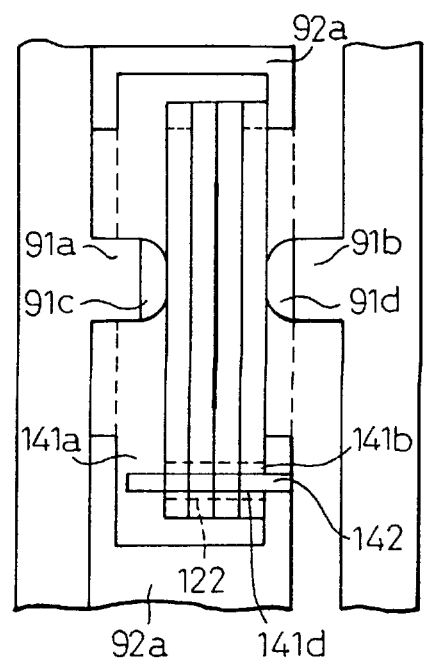
FIG. 14(c) shows the same with the head of the adapter biased to the right.

FIG. 14(a) is a partial sectional view showing a disk-cartridge-type adapter according to the fifth embodiment of the present invention, inserted in the FDD 70 of FIG. 9(a). FIG. 14(b) shows the adapter with a head 81a thereof shifted leftward, and FIG. 14(c) shows the adapter with the head 81a shifted rightward.

In FIG. 14(a), the head 81a has a magnet 81. The FDD 70 has the magnetic head 91 that has the head elements 91a and 91b provided with the tips 91c and 91d, respectively. The adapter has a casing 92a. The head 81a of the adapter is protected with films 101a and 101b and reinforced with supports 121a and 121b that are fitted to the casing 92a with a shaft 142 passing through holes 122. These parts are basically the same as those of the first to fourth embodiments.

If the head 81a is fixed to the casing 92a of the adapter, the head 81a may sometimes receive uneven pressure from the head elements 91a and 91b of the FDD 70 after the adapter is inserted into the FDD 70. This is because the position of the head 81a differs depending on the manufacturer thereof and varies due to manufacturing errors. If the head 81a is unevenly pressed with the head elements 91a and 91b of the FDD 70, both the heads of the adapter and FDD 70 will be broken. To avoid this, the fifth embodiment makes the diameter of the holes 122 larger than the diameter of the shaft 142. In addition, the fifth embodiment forms gaps 141a and 141c between each wall of the casing 92a and the head 81a and positions the head 81a at the center of the casing 92a. A gap 141b between the shaft 142 and the holes 122 allows the head 81a to move within the gaps 141a and 141c. As a result, the head 81a is evenly pressed by the head elements 91a and 91c of the FDD 70.

In FIG. 14(a), the head 81a of the adapter is at the center between the head elements 91a and 91b of the magnetic head 91 of the FDD 70. In this case, the gaps 141a and 141c between the head 81a and the casing 92a are equal to each other.

In FIG. 14(b), the head element 91b pushes the head 81a leftward. As a result, the gap 141a disappears, and the gap 141c is enlarged.

In FIG. 14(c), the head element 91a pushes the head 81a rightward. As a result, the gap 141c disappears, and the gap 141a is enlarged.

Although the shaft 142 passes through the casing 92a in FIGS. 14(a) to 14(c), the shaft 142 may be formed integrally with the casing 92a.

Sixth Embodiment

The sixth embodiment of the present invention will be explained with reference to FIGS. 15 to 19.

Figure 15A:
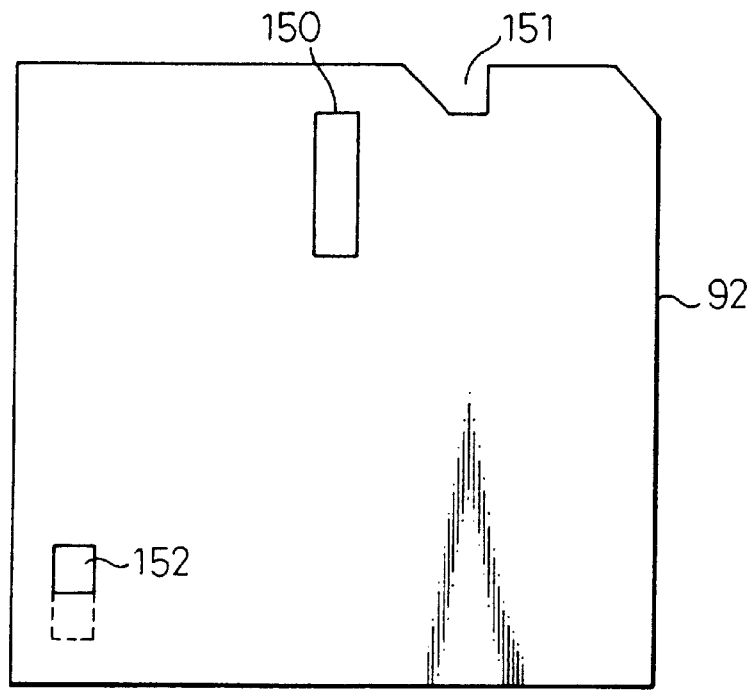
FIG. 15(a) is an external view showing the surface of a disk-cartridge-type adapter according to a sixth embodiment of the present invention.
Figure 15B:
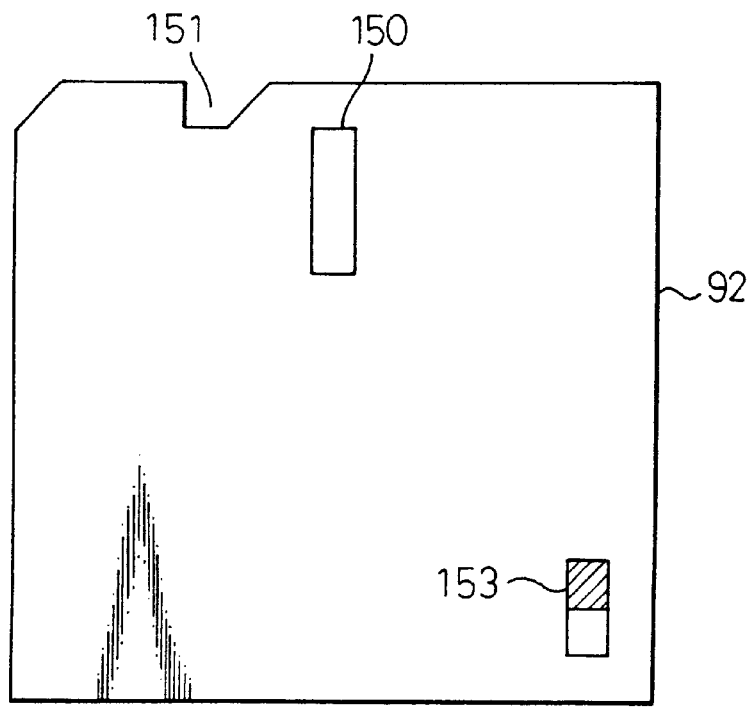
FIG. 15(b) is an external view showing the back of the same.

FIG. 15(a) is an external view showing the surface of a disk-cartridge-type adapter according to the sixth embodiment, and FIG. 15(b) is an external view showing the back of the adapter. The adapter has a write-protect hole 152 formed at a lower left part on the surface of the adapter. The write-protect hole 152 corresponds to the write-protect mechanism of a 3.5-inch FPD. A slider 153 is arranged on the back of the adapter, to close the hole 152 to disable write protection, and to open the same to enable write protection.

Figure 16A:
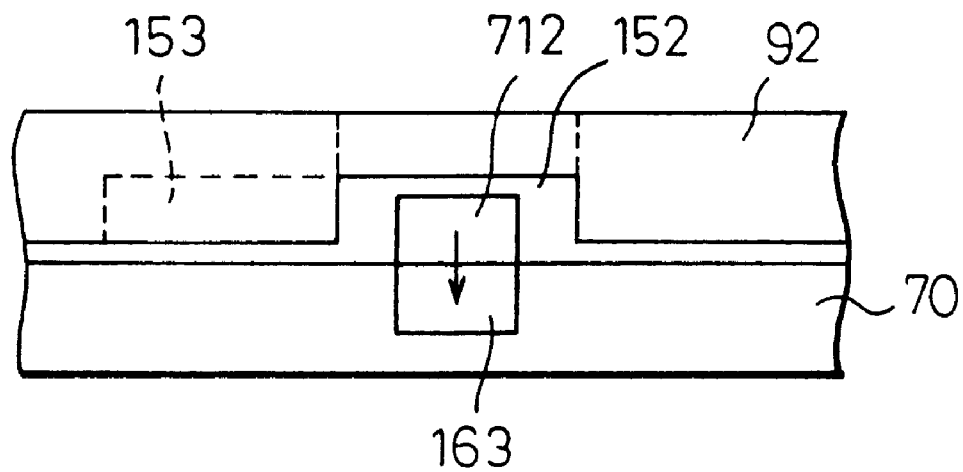
FIGS. 16(a) and 16(b) are sectional views showing an arrangement for mechanically detecting the opening and closing of a hole of the adapter according to the sixth embodiment.
Figure 16B:
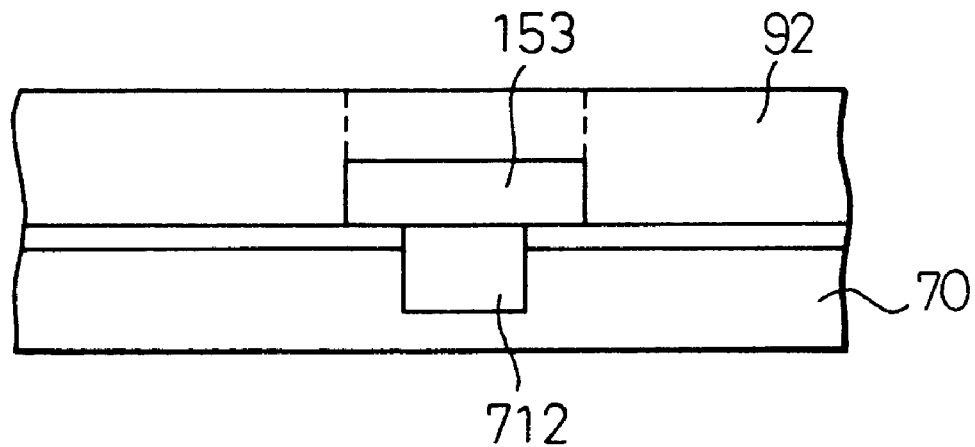

FIGS. 16(a) and 16(b) are sectional views showing an arrangement for mechanically detecting the opening and closing of the hole 152, according to the sixth embodiment. In this case, the write-protect detecting mechanism 712 (FIG. 7) of the FDD 70 is of a mechanical type. In FIG. 16(a), the slider 153 is shifted to open the hole 152 of the adapter 92. When the adapter 92 of this state is inserted into the FDD 70, the slider 153 does not push the mechanism 712. A processor (not shown) of the FDD 70 detects this state of the mechanism 712 and disables write operation. In FIG. 16(b), the slider 153 is shifted to close the hole 152. When the adapter 92 of this state is inserted into the FDD 70, the slider 153 pushes the mechanism 712. The processor of the FDD 70 detects this state of the mechanism 712 and enables a write operation.

Figure 17A:
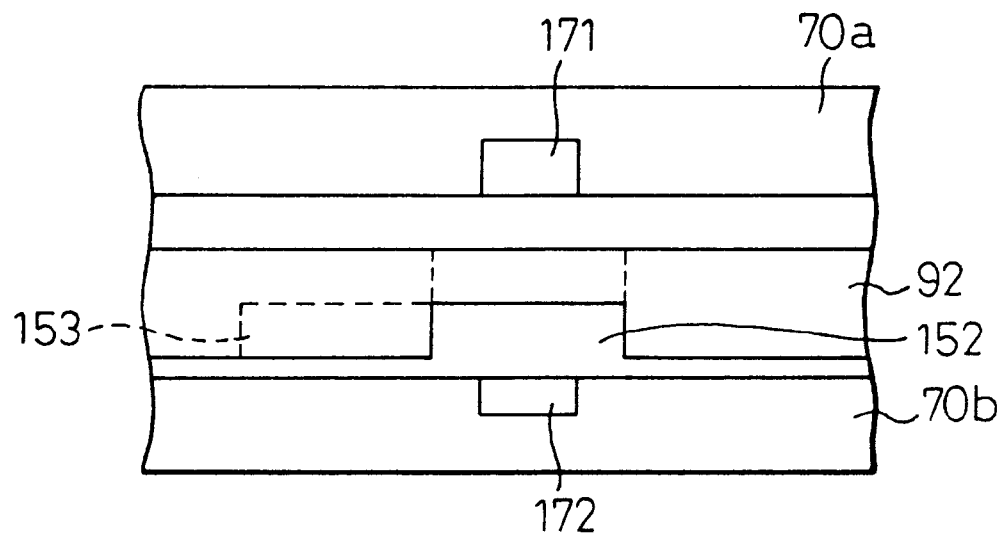
FIGS. 17(a) and 17(b) are sectional views showing an arrangement for optically detecting the opening and closing of the hole of the adapter according to the sixth embodiment.
Figure 17B:
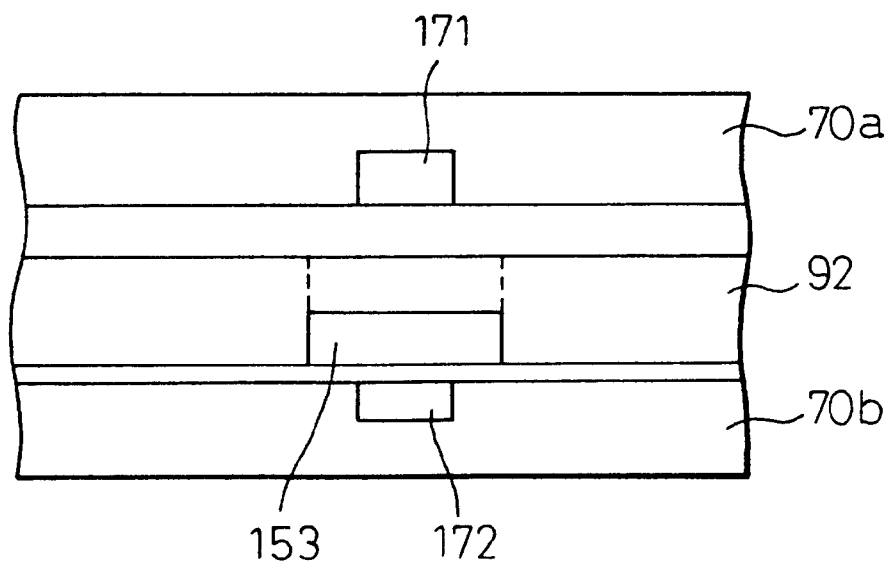

FIGS. 17(a) and 17(b) show an arrangement for optically detecting the opening and closing of the hole 152 according to the sixth embodiment. In this example, the FDD 70 has an optical write-protect detecting mechanism consisting of a light emitting element 171 arranged on an upper face 70a of the FDD 70 and a light receiving element 172 arranged on a lower face 70b of the FDD 70. These elements 171 and 172 are positioned to face the write-protect hole 152 of the adapter 92 when the adapter 92 is inserted into the FDD 70. In FIG. 17(a), the slider 153 is positioned to open the hole 152. When the adapter 92 of this state is inserted into the FDD 70, the light receiving element 172 receives light from the light emitting element 171, and the processor of the FDD 70 detects the output of the light receiving element 171, to disable write operation. In FIG. 17(b), the slider 153 is positioned to close the hole 152. If the adapter 92 of this state is inserted into the FDD 70, light from the light emitting element 171 is blocked by the slider 153 and does not reach the light receiving element 172. The processor of the FDD 70 detects this state and enables write operation.

In this way, the sixth embodiment provides the adapter 92 with the write-protect function of an FPD, to disable write operation from the FDD, to thereby easily protect important data stored in the adapter 92.

The state of the write-protect mechanism of FIGS. 16 and 17 must be recognized not only by the processor of the FDD 70 but also by the MPU 46 (FIG. 4) of the adapter 92. Even if the adapter 92 is in a write-protect state, the FDD 70 may provide a write request due to some error. In such a case, the MPU of the adapter 92 must maintain the write-protect state to prevent an erroneous write operation.

Means for letting the MPU of the adapter 92 recognize the state of the write-protect mechanism will be explained.

Figure 18A:
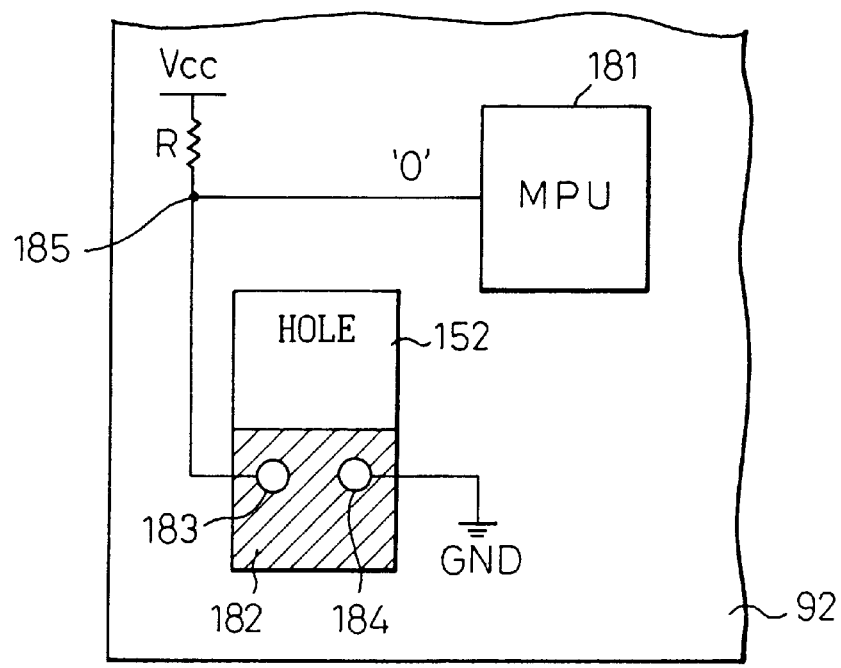
FIGS. 18(a) and 18(b) are partial plan views showing a disk-cartridge-type adapter having a conductive plate on a write-protect slider.
Figure 18B:
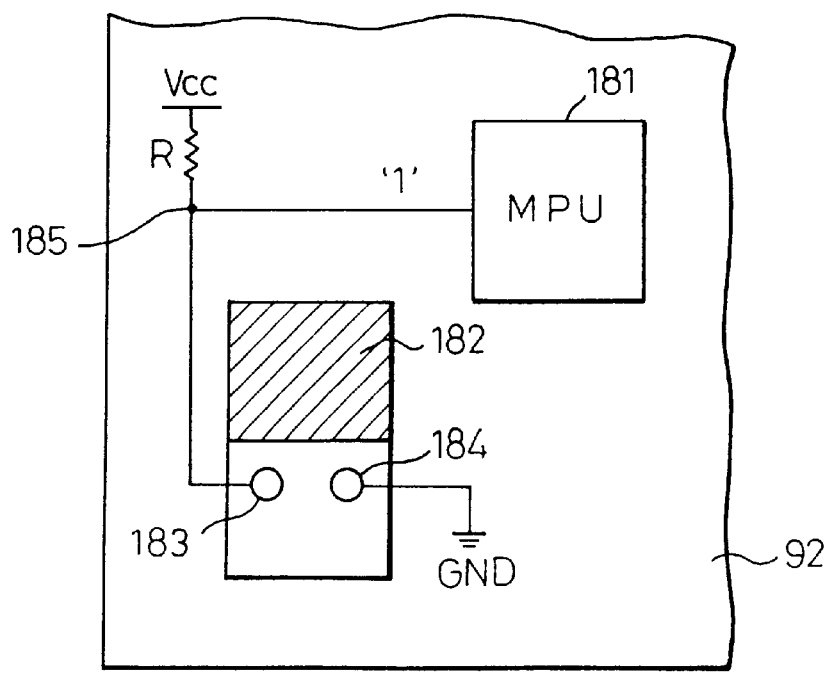

FIGS. 18(a) and 18(b) are partial plan views showing a conductive plate 182 attached to the surface of the slider 153 (FIG. 16) of the adapter 92. A terminal 183 is connected to a source voltage Vcc through a resistor R. A terminal 184 is connected to a ground GND. A node 185 between the resistor R and the terminal 183 is connected to the MPU 181 (corresponding to the MPU 46 of FIG. 4) of the adapter 92. In FIG. 18(a), the terminals 183 and 184 are connected to each other through the plate 182.

While the terminals 183 and 184 are being connected to each other through the plate 182 as shown in FIG. 18(a), the voltage of the node 185 is at a ground level. This state is judged as "0" by the MPU 181, which determines that the adapter 92 is write-protected. Even if the FDD 70 issues a write request, the MPU 181 rejects the request.

In FIG. 18(b), the plate 182 closes the hole 152, and the terminals 183 and 184 are electrically disconnected from each other. Accordingly, the voltage of the node 185 is Vcc. This state is judged as "1" by the MPU 181, which determines that the adapter 92 is in a write enabled state and allows write operation to the adapter 92.

Figure 19A:
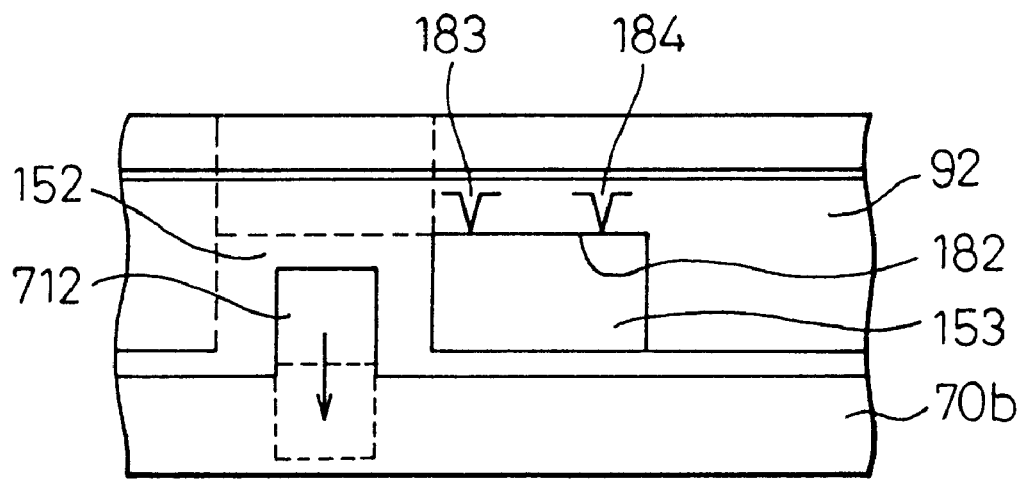
FIG. 19(a) is a partial sectional view showing the adapter of FIG. 18(a) inserted in an FDD.

FIG. 19(a) is a partial sectional view showing the adapter 92 of FIG. 18(a) inserted in the FDD 70. Reference mark 70b indicates a lower part of the FDD 70. The slider 153 is positioned to open the hole 152, the write-protect mechanism 712 of the FDD 70 is not pushed, and the plate 182 electrically connects the terminals 183 and 184 to each other. As a result, the processor of the FDD 70 and the MPU 181 of the adapter 92 recognize that the adapter 92 is write-protected.

Figure 19B:
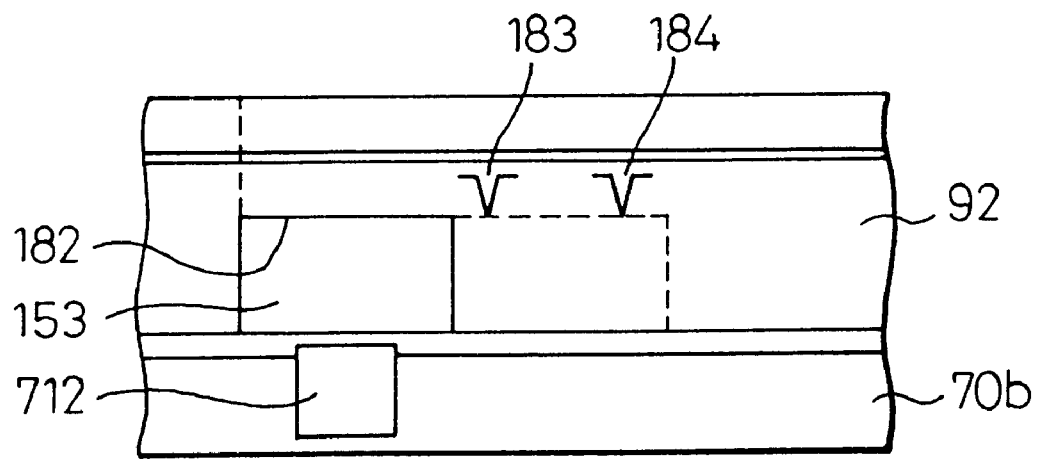
FIG. 19(b) is a partial sectional view showing the adapter of FIG. 18(b) inserted in an FDD.

FIG. 19(b) is a partial sectional view showing the adapter 92 of FIG. 18(b) inserted in the FDD 70. The slider 153 is positioned to close the hole 152 and push the write-protect mechanism 172 of the FDD 70, and the terminals 183 and 184 of the adapter 92 are electrically disconnected from each other. As a result, the processor of the FDD 70 and the MPU 181 of the adapter 92 recognize that the adapter 92 is in a write enabled state.

Seventh Embodiment

The seventh embodiment of the present invention will be explained with reference to FIGS. 20 to 27.

The seventh embodiment provides a disk-cartridge-type adapter with a double-density detecting mechanism, which is an equivalent of that of a 3.5-inch FPD, at the same position as that of the FPD. The adapter and an FDD in which the adapter is inserted recognize whether the adapter is of single density or double density and establish communication between them accordingly.

The FDD determines whether the inserted adapter is of single density or double density according to whether or not the adapter has a double-density detecting hole that is equal to that formed on an FPD.

The adapter determines whether the adapter itself is of single density or double density according to the shape of a card unit such as an IC card or a semiconductor memory inserted therein, or according to whether or not the card unit has a conductive plate.

Figure 20A:
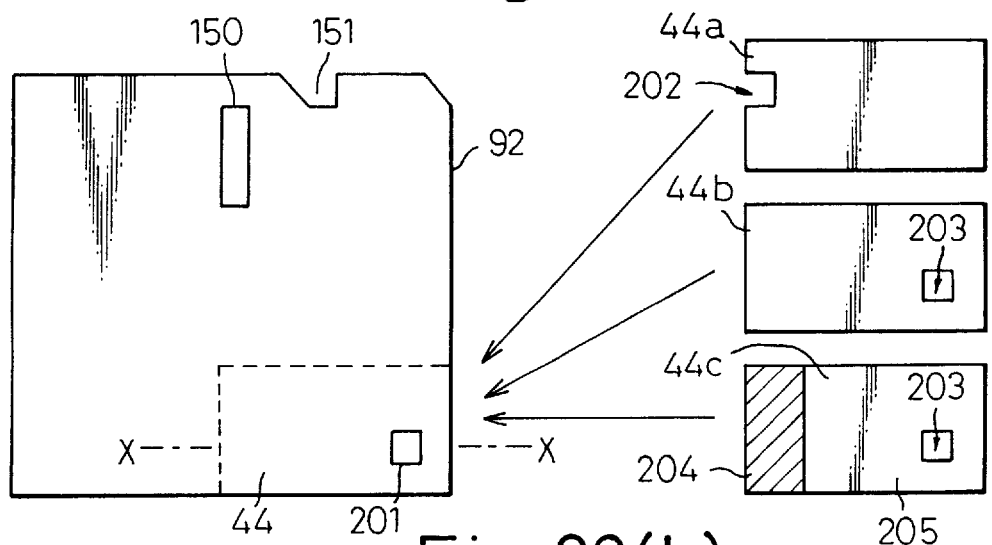
FIG. 20(a) is an external view showing a disk-cartridge-type adapter according to a seventh embodiment of the present invention.
Figure 20B:
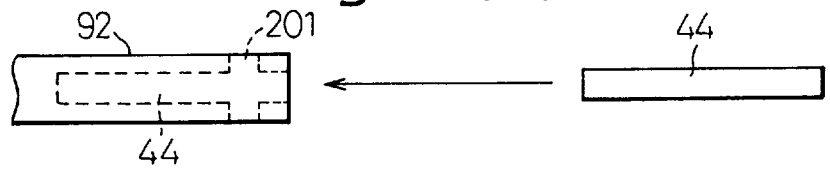
FIG. 20(b) is a sectional view taken along a line X—X of FIG. 20(a) showing the adapter with an IC card inserted therein.

FIG. 20(a) is an external view showing the surface of a disk-cartridge-type adapter according to the seventh embodiment, and FIG. 20(b) is a sectional view taken along a line X—X of FIG. 20(a), showing the adapter and a card unit 44 such as an IC card to be inserted into the adapter.

The adapter 92 has a double-density detecting hole 201 formed at a lower right part on the surface thereof. The hole 201 corresponds to the double-density detecting mechanism of a 3.5-inch FPD to detect whether or not the FPD is of 2HD or 2DD. Similar to the FPD, the adapter 92 will be of single density if the hole 201 is closed, and of double density if the hole 201 is opened.

As shown in FIG. 20(a), the card unit 44 may be a single-density card unit 44a having a cut 202, a double-density card unit 44b having a hole 203 that corresponds to the hole 201 of the adapter 92, or a double-density card unit 44c having a hole 203 corresponding to the hole 201. The surface of the card unit 44c is divided into a conductive part 204 and a non-conductive part 205.

Figure 21:
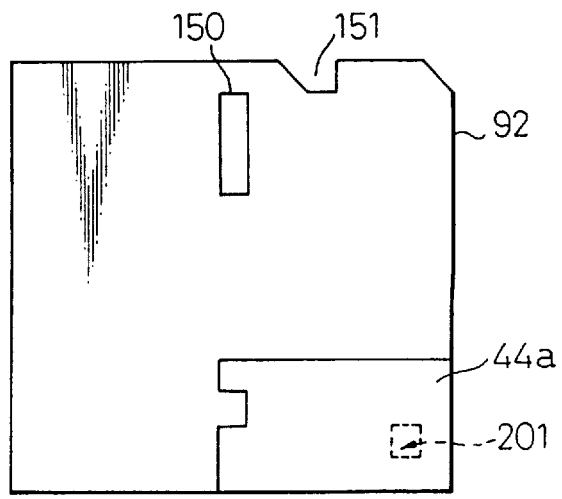
FIG. 21 is a top view showing the adapter of the seventh embodiment with a single-density card unit inserted therein.

FIG. 21 is a top view showing the adapter 92 with the single-density card unit 44a inserted therein. The card unit 44a closes the hole 201, and therefore, the FDD 70 establishes single-density communication with respect to the adapter 92.

Figure 22:
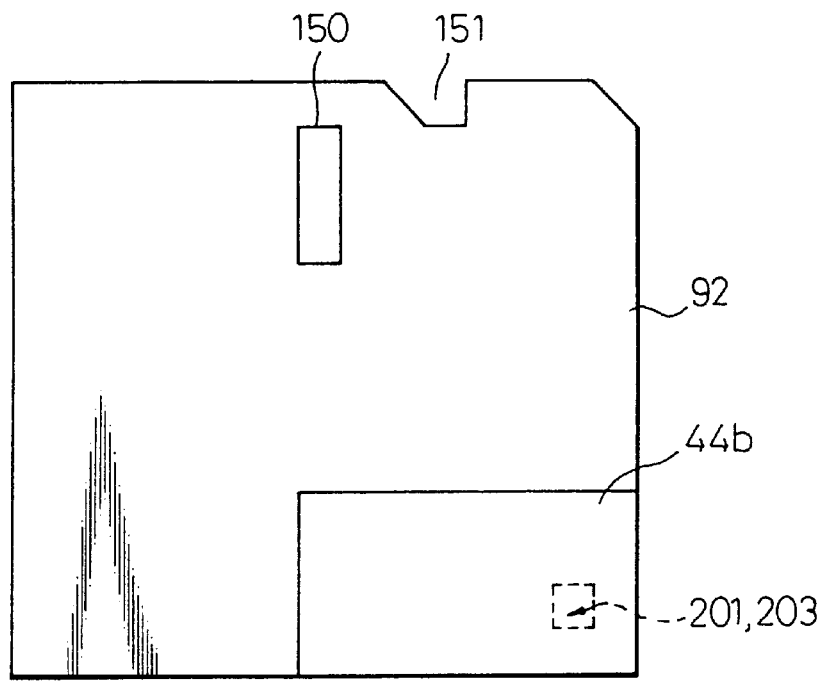
FIG. 22 is a top view showing the adapter of the seventh embodiment with a double-density card unit inserted therein.

FIG. 22 is a top view showing the adapter 92 with the double-density card unit 44b inserted therein. The hole 203 of the card unit 44b agrees with the hole 201 of the adapter 92, and therefore, the hole 201 is open. The FDD 70 detects this state and establishes double-density communication with respect to the adapter 92.

Figure 23:
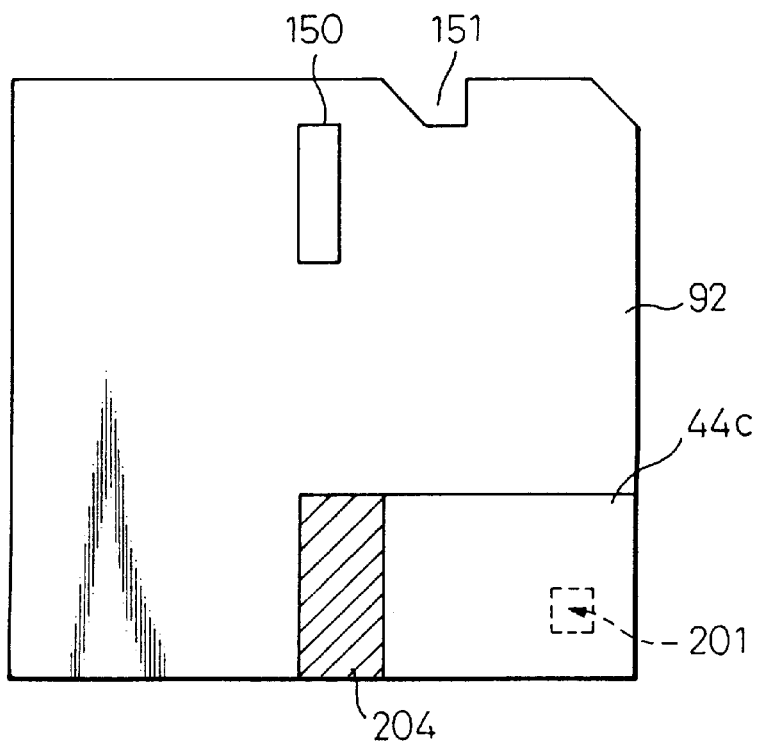
FIG. 23 is a top view showing the adapter of the seventh embodiment with another double-density card unit inserted therein.

FIG. 23 is a top view showing the adapter 92 with the double-density card unit 44c inserted therein. The hole 203 of the card unit 44c agrees with the hole 201 of the adapter 92, and therefore, the hole 201 is open. The FDD 70 detects this state and establishes double-density communication with respect to the adapter 92.

Figure 24A:
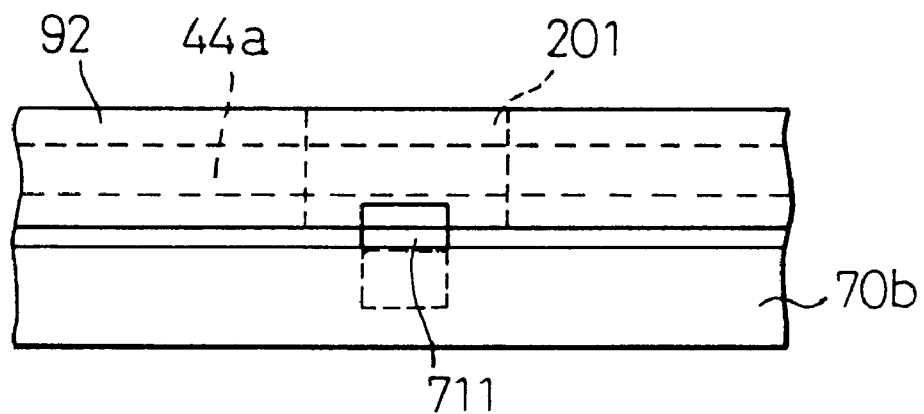
FIGS. 24(*a*) and 24(*b*) are sectional views showing an arrangement for mechanically detecting the opening and closing of a hole of the adapter according to the seventh embodiment.
Figure 24B:
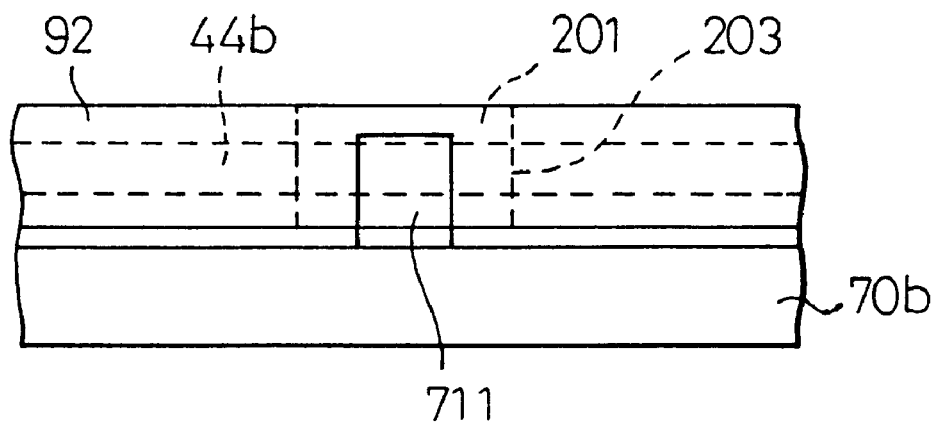

FIGS. 24(a) and 24(b) are sectional views showing an arrangement for mechanically detecting the opening and closing of the hole 201 of the adapter 92 according to the seventh embodiment. In this case, the double-density detecting mechanism 711 (FIG. 7) of the FDD 70 is of a mechanical type. If the single-density card unit 44a is in the adapter 92 as shown in FIG. 21, the hole 201 of the adapter 92 is closed by the card unit 44a because the card unit 44a has no hole. When the adapter 92 is inserted into the FDD 70, the card unit 44a pushes the mechanism 711 of the FDD 70. The processor (not shown) of the FDD 70 detects this state and establishes single-density communication. If the double-density card unit 44b is in the adapter 92 as shown in FIG. 22, the hole 201 of the adapter 92 is not closed because the card unit 44b has the hole 203. When the adapter 92 is inserted into the FDD 70, the holes 201 and 203 allow the mechanism 711 of the FDD 70 to pass therethrough. The processor of the FDD 70 detects this state and establishes double-density communication.

Figure 25A:
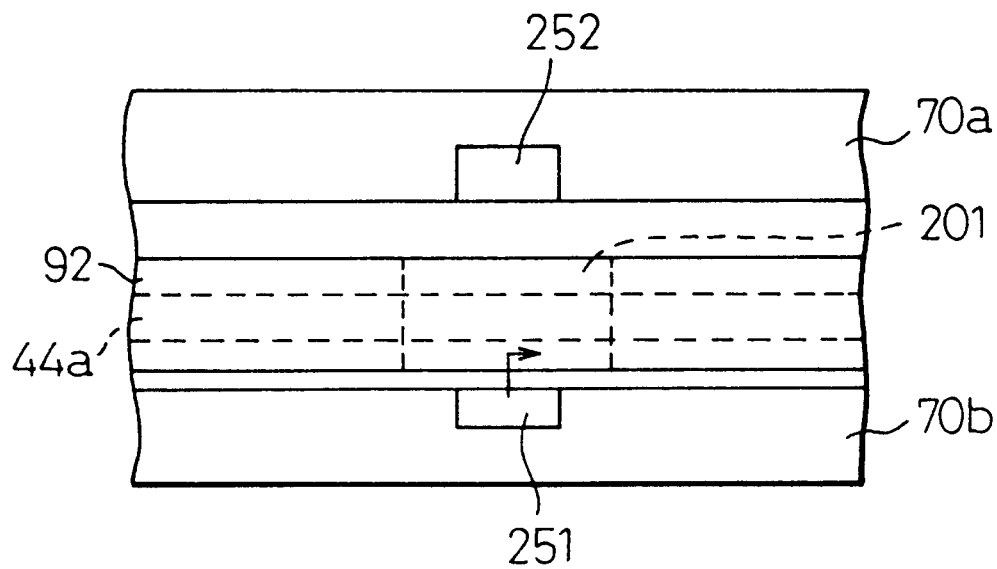
FIGS. 25(*a*) and 25(*b*) are sectional views showing an arrangement for optically detecting the opening and closing of the hole of the adapter according to the seventh embodiment.
Figure 25B:
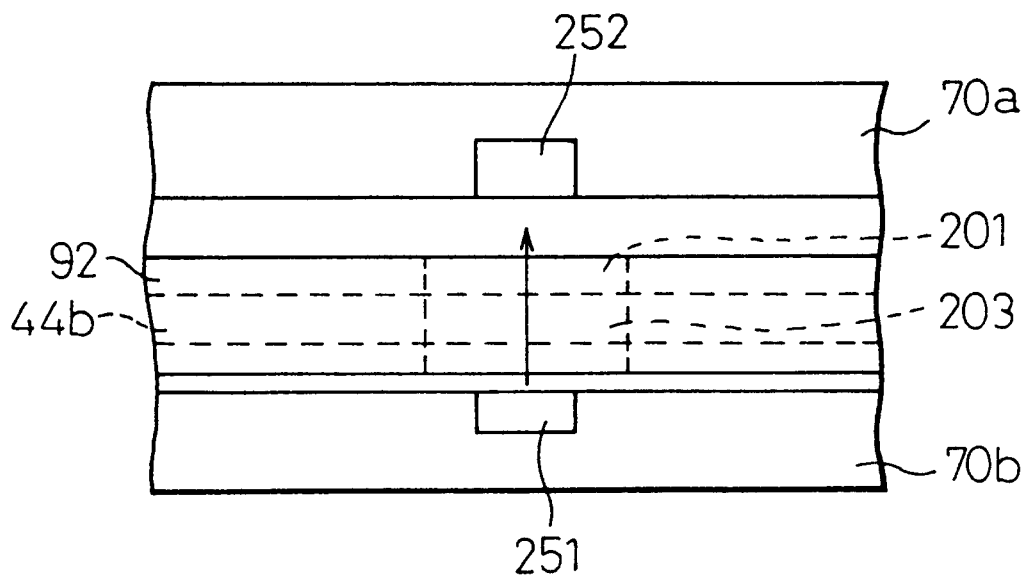

FIGS. 25(a) and 25(b) are sectional views showing an arrangement for optically detecting the opening and closing of the hole 201 of the adapter 92 according to the seventh embodiment. In this case, the double-density detecting mechanism of the FDD 70 is optical. If the single-density card unit 44a is in the adapter 92, the card unit 44a closes the hole 201 of the adapter 92 because the card unit 44a has no hole. When the adapter 92 is inserted into the FDD 70, light from a light emitting element 251 on a lower part 70b of the FDD 70 is blocked by the card unit 44a and does not reach a light receiving element 252. The processor of the FDD 70 detects this state and establishes single-density communication. If the double-density card unit 44b is in the adapter 92, the hole 201 of the adapter 92 is open because the card unit 44b has the hole 203. When the adapter 92 is inserted into the FDD 70, light from the light emitting element 251 passes through the holes 201 and 203 and reaches the light receiving element 252. The processor of the FDD 70 detects this state and establishes double-density communication.

In this way, the seventh embodiment provides a disk-cartridge-type adapter with the double-density detecting function of FPDs, to let an FDD detect the recording density of the adapter.

To establish communication between an FDD and a disk-cartridge-type adapter at a speed proper for the recording density of the adapter, not only the processor of the FDD but also the MPU (46 of FIG. 4) of the adapter must recognize the recording density of the adapter.

Means for letting the MPU of the adapter 92 recognize the recording density thereof will be explained.

Figure 26A:
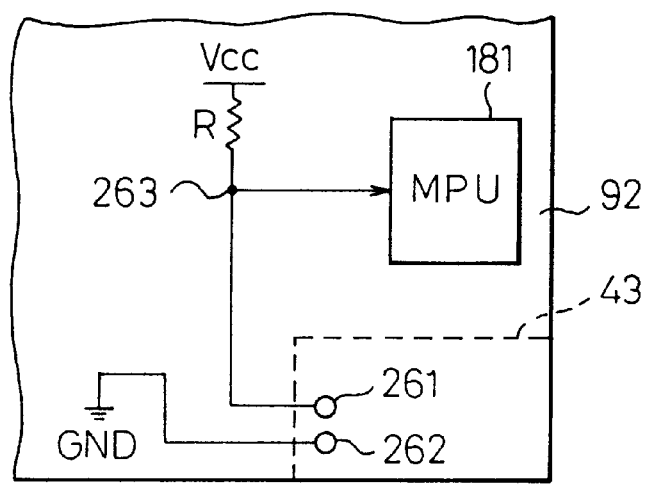
FIG. 26(*a*) is a partial plan view showing a disk-cartridge type adapter having terminals in a space for accommodating an IC card, according to the seventh embodiment, FIG. 26(*b*) shows the adapter with a single-density card unit inserted therein, and FIG. 26(*c*) shows the adapter with a double-density card unit inserted therein.

FIG. 26(a) is a partial plan view showing a disk-cartridge-type adapter 92 having terminals 261 and 262 in a card space 43. The terminal 261 is connected to a source voltage Vcc through a resistor R, and the terminal 262 is connected to a ground GND. A node 263 between the resistor R and the terminal 261 is connected to an MPU 181 (corresponding to the MPU 46 of FIG. 4) of the adapter 92.

Figure 26B:
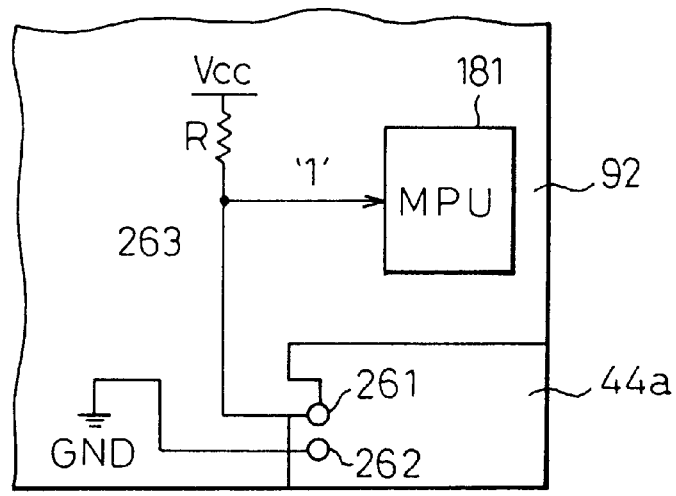

FIG. 26(b) shows the adapter 92 with the single-density card unit 44a of FIG. 20(a) inserted in the card space 43. The surface of the card unit 44a is covered with non-conductive material, and therefore, the terminals 261 and 262 are electrically isolated from each other. Accordingly, the voltage of the node 263 is Vcc. The MPU 181 detects this state as "1" to determine that the adapter 92 is of single density.

Figure 26C:
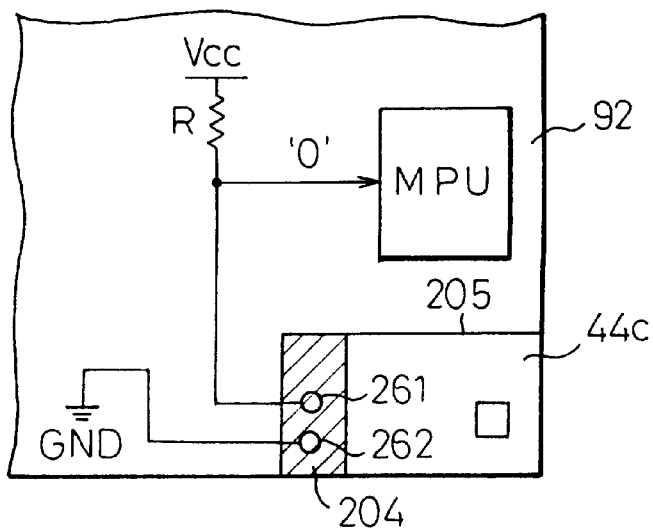

FIG. 26(c) shows the adapter 92 with the double-density card unit 44c of FIG. 20(a) inserted in the card space 43. The card unit 44c has the conductive part 204 that electrically connects the terminals 261 and 262 to each other, and therefore, the voltage of the node 263 is at ground level. The MPU 181 detects this state as "0" to determine that the adapter 92 is of double density.

Another means for letting the MPU 46 of the adapter 92 recognize the recording density thereof will be explained.

Figure 27A:
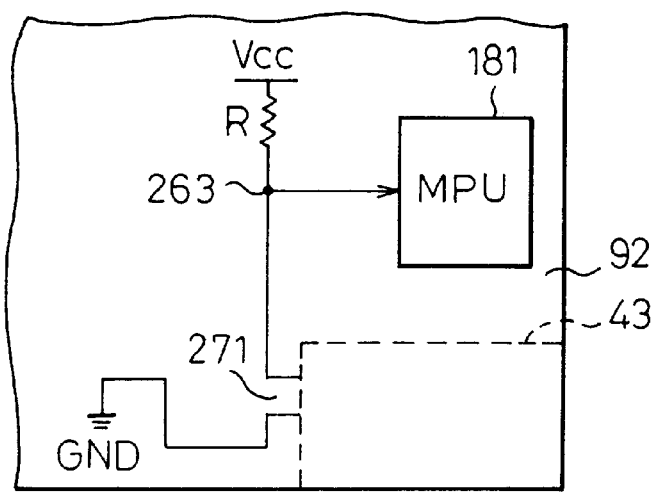
FIG. 27(*a*) is a plan view showing a disk-cartridge-type adapter having an open/close switch in a space for accommodating an IC card, according to the seventh embodiment, FIG. 27(*b*) shows the adapter with a single-density card unit inserted therein, and FIG. 27(*c*) shows the adapter with a double-density card unit inserted therein.

FIG. 27(a) is a plan view showing a disk-cartridge-type adapter 92 having a card space 43 provided with an open/close switch 271. A terminal of the switch 271 is connected to a source voltage Vcc through a resistor R, and the other terminal thereof is connected to a ground GND. A node 263 between the resistor R and the corresponding terminal of the switch 271 is connected to an MPU 181 (corresponding to the MPU 46 of FIG. 4) of the adapter 92.

Figure 27B:
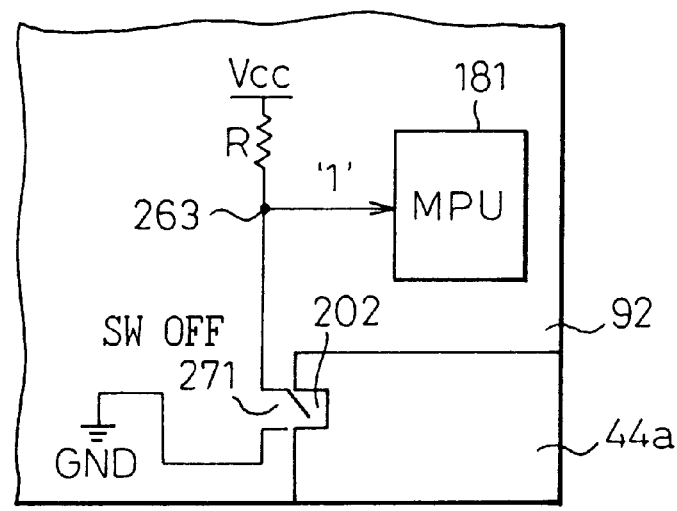

FIG. 27(b) shows the adapter 92 with the single-density card unit 44a of FIG. 20(a) inserted in the card space 43. The card unit 44a has the cut 202, which keeps the switch 271 open. As a result, the voltage of the node 263 is Vcc. The MPU 181 detects this state as "1" to determine that the adapter 92 is of single density.

Figure 27C:
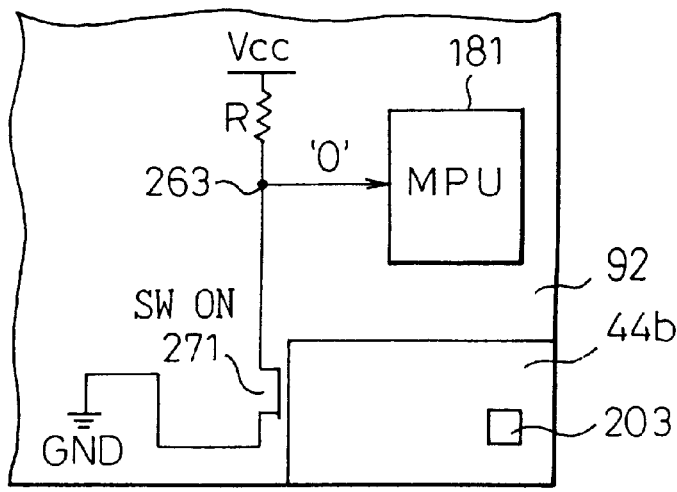

FIG. 27(c) shows the adapter 92 with the double-density card unit 44b of FIG. 20(a) inserted in the card space 43. The card unit 44b has no cut, and therefore, an edge of the card unit 44b closes the switch 271, to bring the voltage of the node 263 to a ground level. The MPU 181 detects this state as "0" to determine that the adapter 92 is of double density.

In this way, the seventh embodiment lets a disk-cartridge-type adapter as well as an FDD detect the recording density of the adapter and properly sets the communication between them.

Eighth Embodiment

The eighth embodiment of the present invention will be explained with reference to FIG. 28.

As explained with reference to FIGS. 3(a) to 3(c), conventional disk-cartridge-type adapters receive a card unit such as an IC card from the top thereof. This involves the problem of breaking or warping the IC card. To solve this problem, the eighth embodiment provides a disk-cartridge-type adapter capable of horizontally receiving a card unit such as an IC card. A slot of the adapter has a stepped part to easily receive a card unit. The adapter also has a hole used to extract a card unit from the adapter.

Figure 28A:
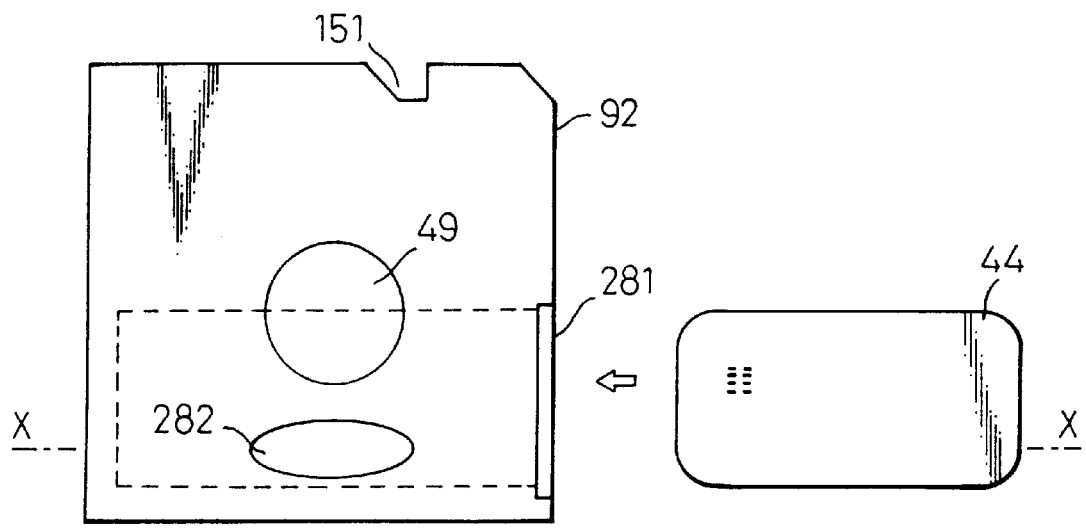
FIG. 28(*a*) is a top view showing a disk-cartridge-type adapter according to an eighth embodiment, FIG. 28(*b*) is a sectional view taken along a line X—X of FIG. 28(*a*), FIG. 28(*c*) is a top view showing the adapter with an IC card inserted therein, and FIG. 28(*d*) is a top view showing the adapter with the IC card being extracted from the adapter.
Figure 28B:
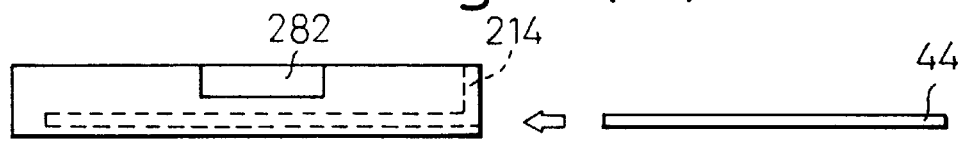
Figure 28C:
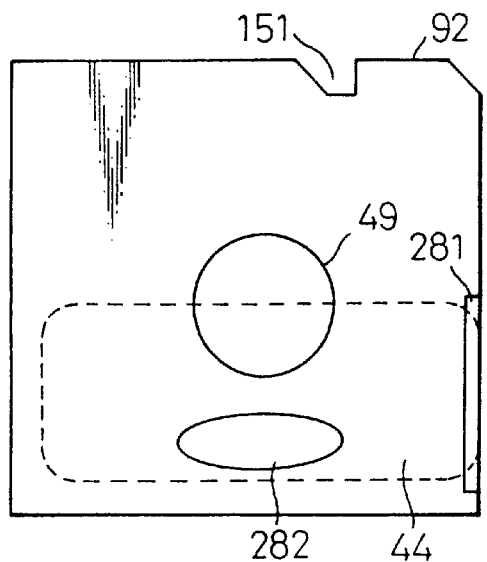
Figure 28D:
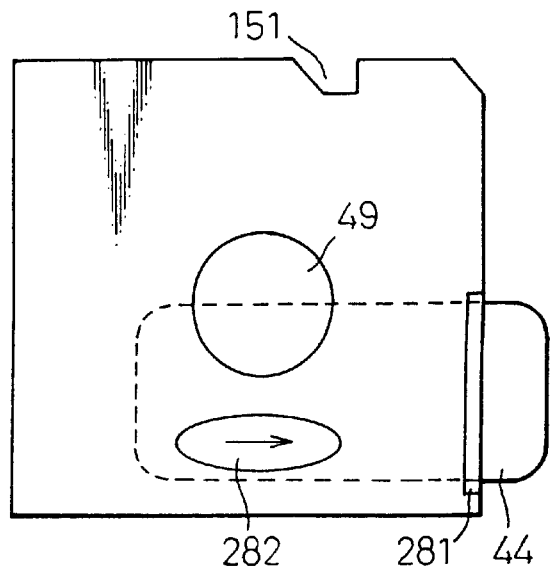

FIG. 28(a) is a top view showing the disk-cartridge-type adapter 92 according to the eighth embodiment, FIG. 28(b) is a sectional view taken along a line X—X of FIG. 28(a), FIG. 28(c) is a top view showing the adapter 92 with an IC card inserted therein, and FIG. 28(d) is a top view showing the adapter 92 with the IC card being extracted therefrom.

The adapter 92 has the stepped part 281 for easily receiving the IC card 44, and the hole 282 used when extracting the IC card 44 from the adapter 92. The stepped part 281 is formed by partly cutting an upper surface of the adapter 92 so that a part of a lower surface of the adapter 92 serves to guide the IC card 44 when the IC card 44 is inserted into the adapter 92.

The IC card 44 is horizontally inserted into the adapter 92 from the right side of the adapter 92. At this time, the stepped part 281 lets the lower surface of the adapter 92 support and guide the IC card 44 so that the IC card 44 is smoothly inserted into the adapter 92 without being broken or warped.

To extract the IC card 44 from the adapter 92, the user may put a finger in the hole 282 to easily carry out the extraction. At this time, there is no risk of damaging the IC card 44.

In this way, the eighth embodiment enables the user to easily insert and extract an IC card into and from the adapter 92 without stressing the IC card or badly affecting an FDD.

Ninth Embodiment

The ninth embodiment of the present invention will be explained with reference to FIGS. 29 to 31.

Figure 29A:
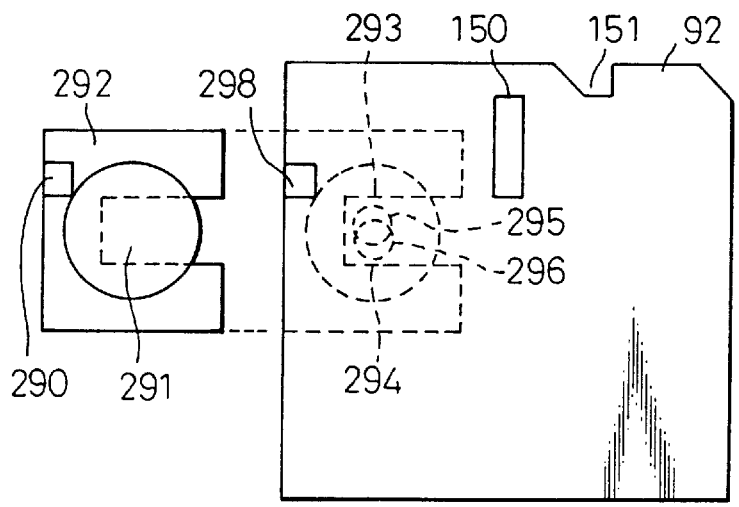
FIG. 29(*a*) is a top view showing a disk-cartridge-type adapter and a battery holder to be inserted into the adapter according to a ninth embodiment of the present invention, and FIG. 29(*b*) is a side view showing the adapter seen from the left of FIG. 29(*a*)
Figure 29B:
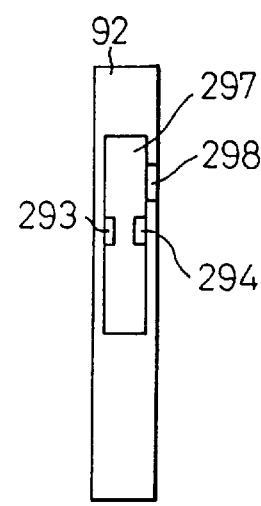

FIG. 29(a) is a top view showing a disk-cartridge-type adapter and a battery holder according to the ninth embodiment, and FIG. 29(b) is a side view seen from the left of FIG. 29(a). The battery holder 292 has a remover 290 and a battery 291. The adapter 92 has a negative terminal 293, a positive terminal 294, a negative lead 295, a positive lead 296, and a battery slot 297. The battery 291 has a button shape.

The battery 291 is stored in the holder 292, and the holder 292 is inserted into the slot 297 of the adapter 92. Then, the positive and negative electrodes of the battery 291 are connected to the positive and negative terminals 294 and 293 of the adapter 92, to supply power to an MPU of the adapter 92 through the leads 296 and 295.

FIGS. 30(a) to 30(f) show the details of the battery holder 292.

Figure 30B:
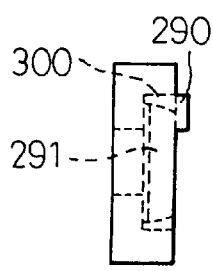
FIGS. 30(*a*) to 30(*f*) show the details of the battery holder.
Figure 30A:
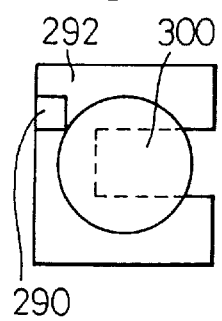
Figure 30C:
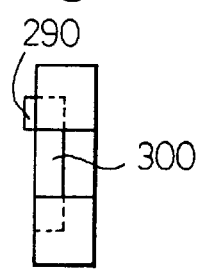
Figure 30D:
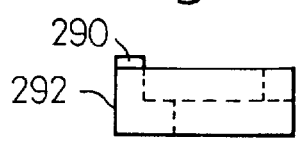
Figure 30E:
Figure 30F:
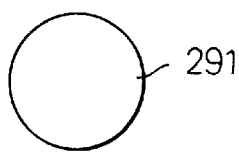

FIG. 30(a) is a top view showing the holder 292, and FIGS. 30(b) to 30(d) are respective side views showing the same. The holder 292 has a recess 300 for accommodating the battery 291. The remover 290 is a projection. FIG. 30(e) is a side view showing the battery 291, and FIG. 30(f) is a top view showing the same.

The recess 300 of the holder 292 firmly holds the battery 291. The remover 290 enables the holder 292 to easily be inserted into and removed from the adapter 92.

Central part of the slot 297 may be cut to surely connect the battery electrodes to the positive and negative terminals of the adapter 92.

The ninth embodiment enables the battery of the adapter 92 to be quickly replaced and causes no change on the external shape of the adapter 92. Accordingly, the adapter 92 with the battery holder 292 can be smoothly inserted into and ejected from an FDD.

Tenth Embodiment

FIG. 31 is a plan view showing a disk-cartridge-type adapter according to the tenth embodiment of the present invention. The adapter has heat radiation holes 312 around a heat generating area 311 where an MPU 46, etc., are installed. The holes 312 provide a heat radiation effect without a cooling device such as a cooling fan, to thereby improve the reliability of the adapter.

In the embodiments mentioned above, the disk-cartridge-type adapters have the same shape as an FPD, and the disk cartridge drive is an FDD. The present invention is not limited to these examples. The shapes of the adapters of the present invention may be adjusted to various types of existing disk cartridges so that the adapters are used with various kinds of disk cartridge drives.

As explained above, the disk-cartridge-type adapter to achieve the first effect of the present invention has a head structure that reduces a risk of damaging a head of the adapter as well as a head of a disk cartridge drive into which the adapter is inserted, even if the heads are deviated from each other.

The disk-cartridge-type adapter to achieve the second effect of the present invention has a write-protect mechanism and/or a double-density detecting mechanism like an FPD.

The disk-cartridge-type adapter to achieve the third effect of the present invention has a structure that enables an IC card and/or a battery to be smoothly inserted into the adapter.

The disk-cartridge-type adapter to achieve the fourth effect of the present invention has an improved heat radiating function to improve the reliability of the adapter.

What is claimed is:

1. An adapter, for receiving a recording medium, shaped like a disk cartridge so that the adapter is insertable into a disk cartridge drive, comprising:

a head to face a head of the disk cartridge drive and transfer data to and from the disk cartridge drive; and a protective film covering each face of the head of the adapter with respect to the head of the disk cartridge drive.

2. The adapter of claim 1, wherein the protective film has at least one groove that runs in a direction in which the head of the disk cartridge drive moves.

3. The adapter of claim 1, further comprising:

a support for fixing the protective film to the head of the adapter, having a hollow in which the head of the disk cartridge drive moves.

4. An adapter, for receiving a recording medium, shaped like a standard disk cartridge so that the adapter is insertable into a disk cartridge drive for said standard disk cartridge, comprising:

a head to face a head of the disk cartridge drive and transfer data to and from the disk cartridge drive;

a shaft for fixing the head of the adapter to the adapter; and a shaft hole formed through the head of the adapter to pass the shaft, the diameter of the shaft hole being larger than that of the shaft so that the head of the adapter is movable in the adapter and is evenly pressed by the head of the disk cartridge drive.

5. An adapter having the same shape as a standard disk cartridge from which information can be read by a disk cartridge drive, said adapter being insertable into said disk cartidge drive, said adapter comprising:

a head to face a head of the disk cartridge drive and transfer data to and from the disk cartridge drive; and a write-protection mechanism, provided on the adapter at the same position as a write-protection mechanism of said standard disk cartridge, for enabling and disabling write operation in the adapter.

6. An adapter having the same shape as a standard disk cartridge from which information can be read by a disk cartridge drive, said adapter being insertable into said disk cartridge drive, said adapter comprising:

a head to face a head of the disk cartridge drive and transfer data to and from the disk cartridge drive;

a card slot through which a card unit having a semiconductor memory for storing various kinds of information is inserted into the adapter; and a double-density detecting mechanism provided at the same position as a double-density mechanism provided in said standard disk cartridge, for detecting whether or not the card unit is of double density by effectively using functions of the disk cartridge drive.

* * * * *